(12) United States Patent
Alston

(10) Patent No.: US 11,928,758 B2
(45) Date of Patent: Mar. 12, 2024

(54) TECHNOLOGIES FOR AUGMENTED-REALITY

(71) Applicant: Christopher Renwick Alston, Vienna, VA (US)

(72) Inventor: Christopher Renwick Alston, Vienna, VA (US)

( * ) Notice: Subject to any disclaimer, the term of this patent is extended or adjusted under 35 U.S.C. 154(b) by 66 days.

(21) Appl. No.: 17/802,729

(22) PCT Filed: Mar. 5, 2021

(86) PCT No.: PCT/US2021/021215
§ 371 (c)(1),
(2) Date: Aug. 26, 2022

(87) PCT Pub. No.: WO2021/178900
PCT Pub. Date: Sep. 10, 2021

(65) Prior Publication Data
US 2023/0109753 A1   Apr. 13, 2023

Related U.S. Application Data

(60) Provisional application No. 62/986,302, filed on Mar. 6, 2020.

(51) Int. Cl.
G06T 11/00       (2006.01)
G06Q 30/0601    (2023.01)

(52) U.S. Cl.
CPC ........ G06T 11/001 (2013.01); G06Q 30/0641 (2013.01)

(58) Field of Classification Search
CPC ........................ G06T 11/001; G06Q 30/0641

USPC ....................................................... 345/633
See application file for complete search history.

(56) References Cited

U.S. PATENT DOCUMENTS

| | | |
|---|---|---|
| 5,960,411 A | 9/1999 | Hartman et al. |
| 7,113,917 B2 | 9/2006 | Jacobi et al. |
| 7,191,117 B2 | 3/2007 | Kirby et al. |
| 7,428,501 B2 | 9/2008 | Dinwoodie |
| 7,702,545 B1 | 4/2010 | Compton et al. |
| 7,783,526 B1 | 8/2010 | Cohen et al. |
| 7,991,646 B2 | 8/2011 | Lewis et al. |
| 8,060,608 B2 | 11/2011 | Wang et al. |
| 8,307,286 B2 | 11/2012 | Sterner et al. |
| 8,326,691 B1 | 12/2012 | Rabenold et al. |

(Continued)

FOREIGN PATENT DOCUMENTS

EP         2680256         1/2014

OTHER PUBLICATIONS

US 8,776,178 B2, 07/2014, Cassidy et al. (withdrawn)

(Continued)

*Primary Examiner* — Thomas J Lett
(74) *Attorney, Agent, or Firm* — Dentons US LLP

(57) ABSTRACT

This disclosure enables various technologies for augmented-reality, which allow a person to obtain (e.g., electronically reserve, electronically purchase, physically receive) a memorabilia item during an event at or remote from a venue in which a performer is performing or within a preset time period after the event (e.g., within few hours after the event) at or remote from the venue. These technologies may reduce a rise in counterfeits of the memorabilia item, while minimizing a price increase of the memorabilia item.

17 Claims, 23 Drawing Sheets

(56) References Cited

U.S. PATENT DOCUMENTS

| | | | |
|---|---|---|---|
| 8,335,723 | B2 | 12/2012 | Tedesco et al. |
| 8,341,036 | B2 | 12/2012 | Hartman et al. |
| 8,463,656 | B2 | 7/2013 | Pandurangan |
| 8,503,995 | B2 | 8/2013 | Ramer et al. |
| 8,595,085 | B2 | 11/2013 | Tedesco et al. |
| 8,694,379 | B2 | 4/2014 | Wiseman et al. |
| 8,706,558 | B2 | 4/2014 | Scheinfeld et al. |
| 8,706,562 | B2 | 4/2014 | Scheinfeld et al. |
| 8,737,974 | B1 | 5/2014 | Sennett et al. |
| 8,751,326 | B2 | 6/2014 | Grove et al. |
| 8,762,221 | B2 | 6/2014 | Chatter et al. |
| 8,776,110 | B1 | 7/2014 | Tenneti |
| 8,776,121 | B2 | 7/2014 | Gossweiler, III |
| 8,776,142 | B2 | 7/2014 | Sezan et al. |
| 8,776,154 | B2 | 7/2014 | Kim et al. |
| 8,776,171 | B2 | 7/2014 | Piersol |
| 8,776,186 | B2 | 7/2014 | Resch et al. |
| 8,776,216 | B2 | 7/2014 | Boccon-Gibod et al. |
| 8,776,219 | B2 | 7/2014 | Bisso et al. |
| 8,918,484 | B2 | 12/2014 | Moncavage et al. |
| 10,505,726 | B1 | 12/2019 | Andon et al. |
| 10,567,450 | B1 | 2/2020 | Gopal et al. |
| 10,872,322 | B2 * | 12/2020 | Siddique ............... G06Q 20/40 |
| 2001/0034697 | A1 | 10/2001 | Kaen |
| 2001/0047329 | A1 | 11/2001 | Ashby |
| 2002/0056119 | A1 | 5/2002 | Moynihan |
| 2002/0091455 | A1 | 7/2002 | Williams |
| 2002/0120554 | A1 | 8/2002 | Vega |
| 2002/0169705 | A1 | 11/2002 | Gutierrez et al. |
| 2003/0046187 | A1 | 3/2003 | Yu |
| 2003/0078858 | A1 | 4/2003 | Angelopoulos et al. |
| 2004/0193529 | A1 | 9/2004 | Asher et al. |
| 2005/0027641 | A1 | 2/2005 | Grove et al. |
| 2005/0177387 | A1 | 8/2005 | Mojsa |
| 2006/0031177 | A1 | 2/2006 | Rule |
| 2006/0230123 | A1 | 10/2006 | Simmons et al. |
| 2007/0106570 | A1 | 5/2007 | Hartman et al. |
| 2007/0189708 | A1 | 8/2007 | Lerman et al. |
| 2007/0203911 | A1 | 8/2007 | Chiu |
| 2007/0294622 | A1 | 12/2007 | Sterner et al. |
| 2008/0234048 | A1 | 9/2008 | Gottlieb |
| 2008/0288338 | A1 | 11/2008 | Wiseman et al. |
| 2009/0099951 | A1 | 4/2009 | Pandurangan |
| 2009/0106127 | A1 | 4/2009 | Purdy et al. |
| 2009/0281926 | A1 | 11/2009 | Lin-Hendel |
| 2009/0327894 | A1 | 12/2009 | Rakib et al. |
| 2011/0004660 | A1 | 1/2011 | Battle |
| 2011/0022500 | A1 | 1/2011 | Scheinfeld et al. |
| 2011/0041059 | A1 | 2/2011 | Amarasingham et al. |
| 2011/0052144 | A1 | 3/2011 | Abbas et al. |
| 2011/0093349 | A1 | 4/2011 | Drescher et al. |
| 2011/0125605 | A1 | 5/2011 | Chatter et al. |
| 2011/0137753 | A1 | 6/2011 | Moehrle |
| 2011/0231260 | A1 | 9/2011 | Price |
| 2011/0251840 | A1 | 10/2011 | Cook et al. |
| 2011/0270717 | A1 | 11/2011 | MacDonald Korth et al. |
| 2012/0005047 | A1 | 1/2012 | Hughes |
| 2012/0011019 | A1 | 1/2012 | Wakim |
| 2012/0042277 | A1 | 2/2012 | Lin-Hendel |
| 2012/0078754 | A1 | 3/2012 | Wiseman et al. |
| 2012/0166303 | A1 | 6/2012 | Godwin et al. |
| 2012/0179548 | A1 | 7/2012 | Sun et al. |
| 2012/0296739 | A1 | 11/2012 | Cassidy et al. |
| 2013/0013465 | A1 | 1/2013 | Scheinfeld et al. |
| 2013/0073389 | A1 | 3/2013 | Heath |
| 2013/0073400 | A1 | 3/2013 | Heath |
| 2013/0085896 | A1 | 4/2013 | Hartman et al. |
| 2013/0132225 | A1 | 5/2013 | Asher et al. |
| 2013/0144903 | A1 | 6/2013 | Andrews et al. |
| 2013/0179292 | A1 | 6/2013 | Pandurangan |
| 2013/0202154 | A1 | 8/2013 | Hirano |
| 2013/0325664 | A1 | 12/2013 | Alegre et al. |
| 2014/0018947 | A1 | 1/2014 | Ales |
| 2014/0076125 | A1 | 3/2014 | Kellett et al. |
| 2014/0081806 | A1 | 3/2014 | Tedesco et al. |
| 2014/0156438 | A1 | 6/2014 | Beavers |
| 2015/0120308 | A1 | 4/2015 | Leistikow et al. |
| 2016/0210602 | A1 | 7/2016 | Siddique et al. |
| 2016/0239876 | A1 | 8/2016 | Ales |
| 2016/0343062 | A1 * | 11/2016 | Morton .................. G06Q 50/12 |
| 2016/0358595 | A1 | 12/2016 | Sung et al. |
| 2018/0032997 | A1 * | 2/2018 | Gordon ............. G06Q 30/0269 |
| 2020/0234682 | A1 | 7/2020 | Alston |
| 2021/0326967 | A1 * | 10/2021 | Geekee ................ G06V 10/764 |
| 2021/0342886 | A1 * | 11/2021 | O'Hanlon ............ G06V 40/172 |

OTHER PUBLICATIONS

Bhunje, E-Commerce, The Geek, downloaded from the internet at http://theegeek.com/e-commerce/ on Sep. 10, 2014, 3 pages.

Business Answers: Patent Pending, downloaded from the internet at www.nbcnews.com/video/your-business/24694230 on Sep. 10, 2014, 2 pages.

Chazal, Is Ecommerce video chat the right tool for you?, customer i care, downloaded from the internet at http://customericare.com/is-ecommerce-video-chat-worth-the-investment/ on Sep. 10, 2014, 9 pages.

Crowell, Using Video to Improve the E-Commerce Shopping Experience, downloaded from the internet at http://video-commerce.org/2011/12/user-experience-video-ecommerce/, published on Dec. 16, 2011, 5 pages.

Crum, Facebook is Buying Video Ad Tech Company LiveRail, downloaded from the internet at http://www.webpronews.com/facebook-is-buying-video-ad-tech-company-liverail-2014-07, published Jul. 2, 2014, 2 pages.

Dickey, Any Video Can be Interactive—and Soon, They All Will be, downloaded from the internet at http://mashable.com/2014/07/01/fuisz-interactive-online-videos/, published on Jul. 1, 2014, 4 pages.

Fach, How to Patent Software, downloaded from the internet at http://www.youtube.com/watch?v=YA4a1Mu31do, published on Mar. 31, 2012, 3 pages.

Foster, Video E-Commerce: Beyond the Experimentation Stage, downloaded from the internet at http://www.emarketer.com/Article.aspx?R=1007695&RewroteTitle=1, published on May 14, 2010, 4 pages.

Foster, Video Commerce, downloaded from the internet at http://www.slideshare.net/liveclicker/video-commerce-and-ecommerce-video-disruptive-innovations-in-ecommerce-presentation, published on Jan. 24, 2009, 9 pages.

Heine, Zappos.com Rolls Out Clickable Product Videos, downloaded from the internet at http://www.clickz.com/clickz/news/1694325/zapposcom-rolls-out-clickable-product-videos, published on Nov. 30, 2009, 10 pages.

Hof, YouTube Debuts Click-to-Buy: E-Commerce for Video, http://www.businessweek.com/the_thread/techbeat/archives/2008/10/post_9.html, published on Oct. 7, 2008, 15 pages.

International Search Report and Written Opinion dated Nov. 26, 2014 in Application PCT/US2014/050690 filed Aug. 12, 2014 (8 pages).

International Search Report and Written Opinion dated May 21, 2021 in Application PCT/US2021/021215 filed Mar. 5, 2021 (12 pages).

Lawler, Video Discovery Startup Showyou Launches Channel Platform, Unveils a Revenue Model, TechCrunch, downloaded from the internet at http://techcrunch.com/2013/06/06/showyou-channels/?icid=tc_art_, published Jun. 6, 2013, 4 pages.

Lombardo, eTail East: The Intersection of Social eCommerce, Mobile eCommerce & Video, downloaded from the internet at http://blog.brightcove.com/en/2010/08/etail-east-intersection-social-ecommerce-mobile-ecommerce-video, published Aug. 16, 2010, 3 pages.

Moser, Liveclicker Helps DHC Connect With Customers Through Video, downloaded from the internet at http://video-commerce.org/2014/01/liveclicker-helps-dhc-connect-with-customers-through-video/, published on Jan. 17, 2014, 3 pages.

Movv App Commercial, downloaded from the internet at https://www.youtube.com/watch?v=eFX3wtGF2il, on Sep. 10, 2014, 2 pages.

(56) References Cited

OTHER PUBLICATIONS

Movv First Video Commerce App, downloaded from the internet at http://www.movv.com/, accessed on Sep. 10, 2014, 1 page.
Nelson, Swipe Right to Buy Dress: The App That's Like Tinder for Shopping, downloaded from the internet at http://mashable.com/2014/07/18/kwoller-tinder-for-shopping/, published Jul. 19, 2014, 4 pages.
Robertson, Using Web Video throughout the Ecommerce Purchase Funnel, downloaded from the internet at http://pt.slideshare.net/reelseo/using-web-video-throughout-the-ecommerce-purchase-funnel, published on Sep. 2, 2011, 5 pages.
Rosensteel, Will Video be the Next Generation in E-Commerce Product Reviews?, downloaded from the internet at http://www.forbes.com/sites/seanrosensteel/2012/05/30/will-video-be-the-next-generation-in-e-commerce-product-reviews/, published on May 30, 2012, 3 pages.
Shu, Mobile Video Consumption is Increasing Dramatically in China, TechCrunch, downloaded from the internet at http://techcrunch.com/2013/08/19/wandoujia-videostats/, published on Aug. 19, 2013, 5 pages.
Sky, State of Video in e-Commerce, downloaded from the internet at http://www.slideshare.net/sundaysky/sunday-skyppt-researchreportg2slideshare, published on Oct. 6, 2010, 4 pages.
Thibeault, Why Video is So Important to the Future of Marketing, downloaded from the internet at http://www.reelseo.com/video-important-future-marketing/, published on Jul. 22, 2013, 7 pages.
Tolman, The Power of Using Video on Your Ecommerce Store, downloaded from the internet at http://www.mivamerchant.com/blog/the-power-of-using-video-on-your-ecommerce-store, published Mar. 13, 2014, 8 pages.
YouTube Monetization—How Much Does it Pay?, Warrior Forum, downloaded from the internet at http://www.warriorforum.com/social-media/623402-youtube-monetization-how-much-does-pay.html, posted Jun. 23, 2012, 9 pages.
Wilson, downloaded from the internet at http://www.pcmag.com/article2/0,2817,2387719,00.asp, published on Jun. 28, 2011, 6 pages.
Will video ecommerce be the next big step for retail?, Nichesuite, downloaded from the internet at http://nichesuiteseo1.wordpress.com/2013/01/11/will-video-ecommerce-be-the-next-big-step-for-retail/, published on Jan. 11, 2013, 3 pages.
YouTube, downloaded from internet, https://web.archive.org/web/20110610213955/http://www.youtube.com/watch?v=6ATw1f_qcEg&feature=dir, Jun. 10, 2011.
Zaroban, JoyUs.com: Shopping via video, internet Retailer, downloaded from the internet at http://www.internetretailer.com/2012/11/27/shopping-video, published Nov. 27, 2012, 2 pages.

\* cited by examiner

Logo and serial number on [3] Closure
on page 5
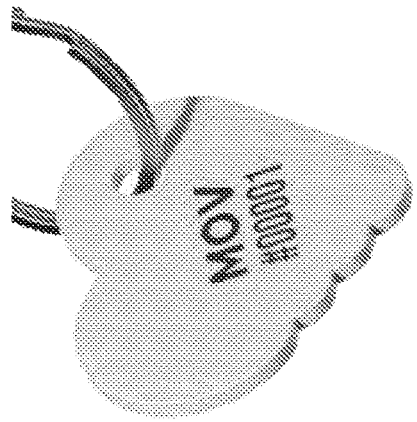
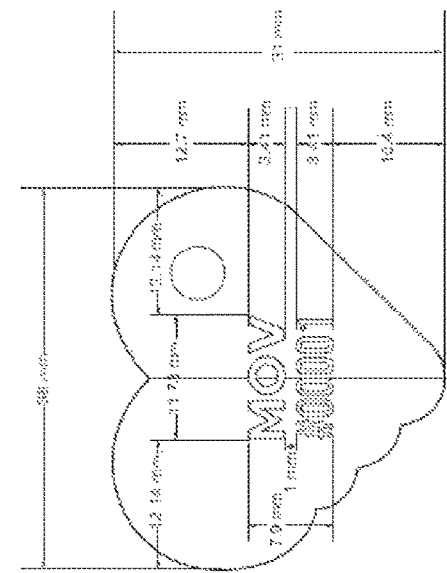
Logo and serial number on [5] Keychain
on page 7
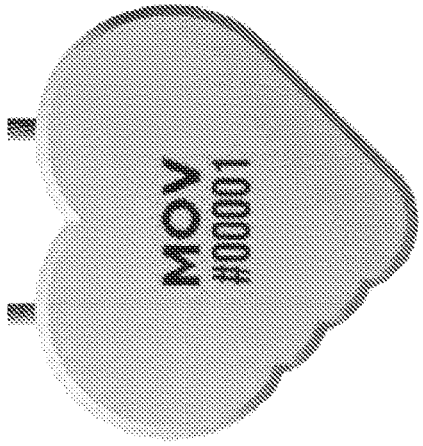
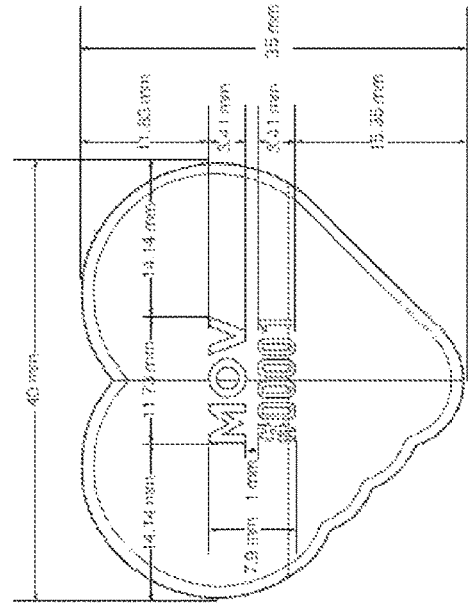
FIG. 10

TECHNOLOGIES FOR AUGMENTED-REALITY

CROSS-REFERENCE TO RELATED PATENT APPLICATION

This patent application claims a benefit of PCT International Application PCT/US2021/021215 filed 5 Mar. 2021; which claims a benefit of US Provisional Patent Application 62/986,302 filed 6 Mar. 2020, each of which is incorporated by reference herein for all purposes.

TECHNICAL FIELD

This disclosure relates to augmented-reality.

BACKGROUND

In this disclosure, where a document, an act, and/or an item of knowledge is referred to and/or discussed, then such reference and/or discussion is not an admission that the document, the act, and/or the item of knowledge and/or any combination thereof was at a priority date, publicly available, known to a public, part of common general knowledge, and/or otherwise constitutes any prior art under any applicable statutory provisions; and/or is known to be relevant to any attempt to solve any problem with which this disclosure is concerned with. Further, nothing is disclaimed.

In order to purchase a sports memorabilia item (e.g., a sneaker, a garment) of a professional athlete (e.g., a basketball player, a soccer player), a person typically visits a seller of such items or uses a software application (e.g., a browser, a mobile app) running on a personal computer (e.g., a desktop, a laptop, a tablet, a mobile phone) to navigate an e-commerce site (e.g., eBay site, Amazon site) selling such items. However, this approach is technologically problematic for several reasons.

First, the sports memorabilia item is typically offered for sale weeks, months, or years after the sports memorabilia item was worn. As such, during that time period, there is a rise in counterfeits of the sports memorabilia item, which makes authenticity validation thereof complicated, laborious, time-consuming, and expensive.

Second, during that time period, there may be a price increase as the sports memorabilia item may be desired to be purchased by many people, especially if the professional athlete died during that time period. As such, the price increase may be unaffordable to the person.

Third, if the person desires to obtain the sports memorabilia item during a professional sports game (e.g., a professional football game, a professional hockey game) in which the professional athlete is playing at a sports venue (e.g., a sports arena, a stadium) or immediately after the sports game (e.g., within few hours after the sports game) at the sports venue, in order to reduce the rise in counterfeits and minimize the price increase, then there is generally no legal way to do so, whether physical or electronic, unless the person has some personal connection to the professional athlete (e.g., teammate thereof, family thereof, friend thereof, service provider thereof).

SUMMARY

Generally, this disclosure enables various technologies for augmented-reality, which address the technical problem explained above. For example, using these technologies, the person may obtain (e.g., electronically reserve, electronically purchase, physically receive) a memorabilia item (e.g., a garment, a shoe, a wearable, a sneaker, a jersey, a ball, a puck, a hockey stick, a golf club, a glove, a baseball glove, a baseball bat, a musical instrument, an accessory) during an event (e.g., a professional sports, a concert, a ballet, an opera) at or remote from a venue (e.g., a basketball court, a rink, a stadium, an arena, a concert hall), in which a performer (e.g., a professional athlete, a basketball player, a soccer play, a baseball player, a football player, a hockey player, a golf player, a rugby player, a musician, a singer, a dancer, a clown) is performing or within a preset time period after the event (e.g., within a few hours after the event) at or remote from the venue. For example, these technologies may reduce the rise in counterfeits of the memorabilia item, while minimizing the price increase of the memorabilia item. For example, this may occur whether the person has or does not have any personal connection to the performer (e.g., teammate thereof, family thereof, friend thereof, service provider thereof).

In an embodiment, a method comprises: receiving, by a server, a set of performer data from a performer client operated by a performer and a set of fan data from a fan client operated by a fan of the player, wherein the performer client has a performer camera and the fan client has a fan camera; generating, by the server, a performer profile based on the set of performer data and a fan profile based on the set of fan data; accessing, by the server, a data structure containing a set of CAD memorabilia item models, a set of color skins for each CAD memorabilia item model of the CAD memorabilia item models, and a set of texture skins for each CAD memorabilia item model of the set of CAD memorabilia item models; accessing, by the server, a calendar having an entry involving the performer profile for a performance event in a venue on a date at a time when the performance event begins; receiving, by the server, an first imagery of a memorabilia item to be worn or used by the performer performing in the performance event in the venue on or before the date and the time when the performance event begins from the performer camera operated in a performer modality of a performer instance of a mobile app running on the performer client and associated with the performer profile, wherein the memorabilia item has an silhouette and an external side with a color and a texture; identifying, by the server, the silhouette of the memorabilia item in the first imagery, the color of the external side in the first imagery, and the texture of the external side in the first imagery; performing, by the server, a first selection of a CAD memorabilia item model from the set of CAD memorabilia item models matching the silhouette of the memorabilia item identified in the first imagery, a second selection of a color skin from the set of color skins matching the color of the external side identified in the first imagery, and a third selection of a texture skin from the set of texture skins matching the texture of the external side identified in the first imagery; applying, by the server, the color skin from the second selection and the texture skin from the third selection to the CAD memorabilia item model from the first selection such that an augmented reality content representative of the memorabilia item is generated; saving, by the server, the augmented reality content such that the augmented reality content is related to the entry in the calendar; sending, by the server, the augmented reality content during or within a preset time period after the performance event based on the entry of the calendar to a fan instance of the mobile app running on the fan client during or within the preset time period after performance event based on the entry of the calendar, associated with the fan profile during or within the preset time period after performance event based on the entry of the calendar, operated in a fan modality different from the performer modality during or within the preset time period after performance event based on the entry of the calendar, and programmed to receive a fan input while operating in the fan modality during or within the preset time period after performance event based on the entry of the calendar such that (a) the fan instance in the fan modality presents the augmented reality content during or within the preset time period after performance event based on the entry of the calendar responsive to (i) the fan camera generating a second imagery with a trigger from imaging the venue during or within the preset time period after performance event based on the entry of the calendar while the fan instance operates in the fan modality during or within the preset time period after performance event based on the entry of the calendar and (ii) the fan instance operating in the fan modality during or within the preset time period after performance event based on the entry of the calendar identifying the trigger in the second imagery during or within the preset time period after performance event based on the entry of the calendar based on the entry of the calendar, (b) the fan instance in operating in the fan modality during or within the preset time period after performance event based on the entry of the calendar receiving the fan input responsive to the augmented reality content being presented in the fan instance operating in the fan modality during or within the preset time period after performance event based on the entry of the calendar, and (c) perform an e-commerce action in the fan instance operating in the fan modality during or within the preset time period after performance event based on the entry of the calendar with respect to the sneaker based on the fan input in the fan instance operating in the fan modality.

DESCRIPTION OF DRAWINGS

FIGS. 6-14, 17 show various views of an embodiment of a tag configured to be secured to a memorabilia item according to this disclosure.

DETAILED DESCRIPTION

Figure 1:
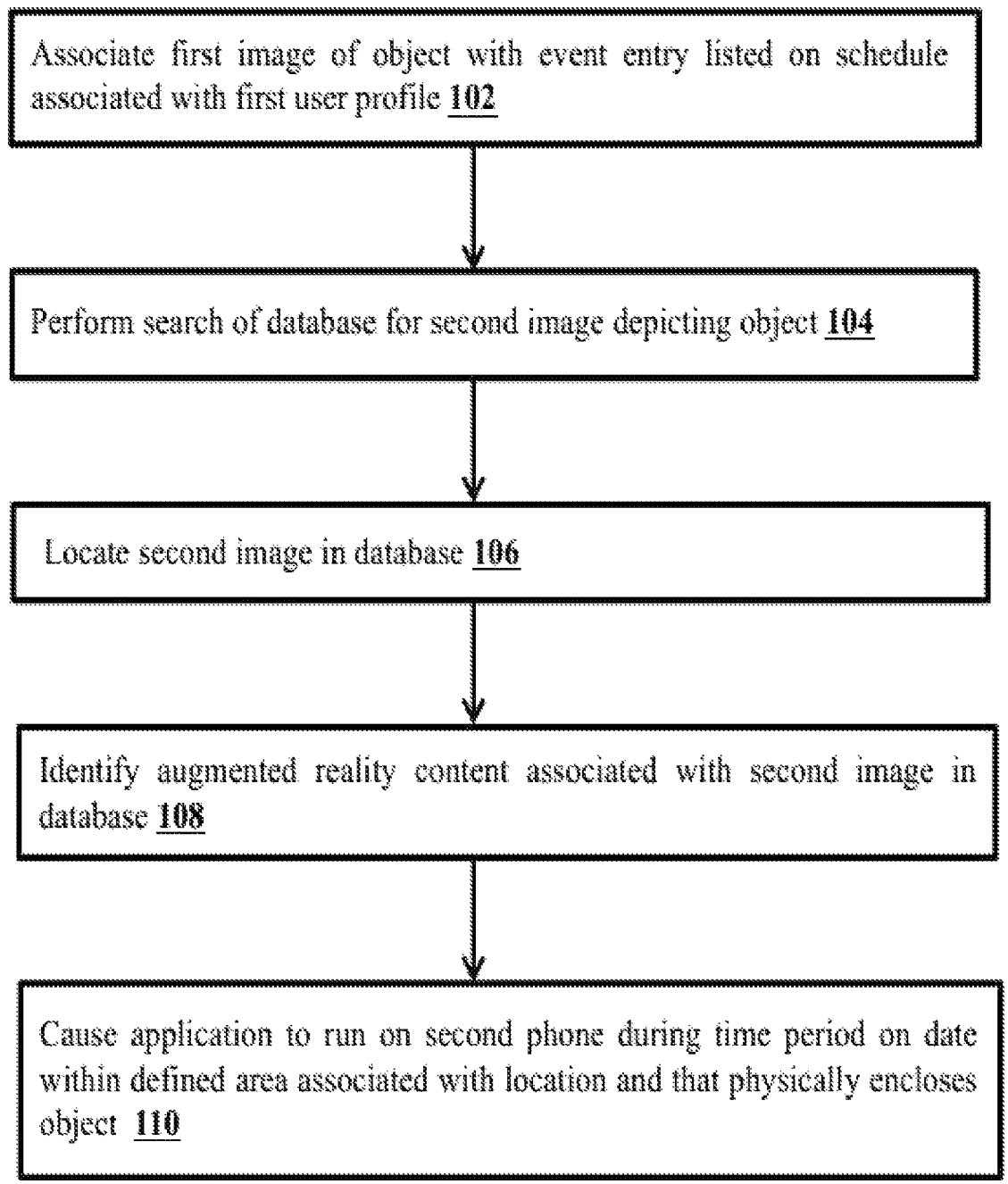
FIG. 1 shows a flowchart of an embodiment of a method for a server to enable an e-commerce transaction based on an augmented reality content according to this disclosure.

Generally, this disclosure enables various technologies for augmented-reality, which address the technical problem explained above. For example, using these technologies, the person may obtain (e.g., electronically reserve, electronically purchase, physically receive) a memorabilia item (e.g., a garment, a shoe, a wearable, a sneaker, a jersey, a ball, a puck, a hockey stick, a golf club, a glove, a baseball glove, a baseball bat, a musical instrument, an accessory) during an event (e.g., a professional sports, a concert, a ballet, an opera) at or remote from a venue (e.g., a basketball court, a rink, a stadium, an arena, a concert hall), in which a performer (e.g., a professional athlete, a basketball player, a soccer play, a baseball player, a football player, a hockey player, a golf player, a rugby player, a musician, a singer, a dancer, a clown) is performing or within a preset time period after the event (e.g., within a few hours after the event) at or remote from the venue. For example, these technologies may reduce the rise in counterfeits of the memorabilia item, while minimizing the price increase of the memorabilia item. For example, this may occur whether the person has or does not have any personal connection to the performer (e.g., teammate thereof, family thereof, friend thereof, service provider thereof). However, note that this disclosure may be embodied in many different forms and should not be construed as necessarily being limited to various embodiments disclosed herein. Rather, these embodiments are provided so that this disclosure is thorough and complete, and fully conveys various concepts of this disclosure to skilled artisans.

Various terminology used herein can imply direct or indirect, full or partial, temporary or permanent, action or inaction. For example, when an element is referred to as being "on," "connected," or "coupled" to another element, then the element can be directly on, connected, or coupled to another element or intervening elements can be present, including indirect or direct variants. In contrast, when an element is referred to as being "directly connected" or "directly coupled" to another element, then there are no intervening elements present.

As used herein, various singular forms "a," "an" and "the" are intended to include various plural forms (e.g., two, three, four, five, six, seven, eight, nine, ten, tens, hundreds, thousands) as well, unless specific context clearly indicates otherwise.

As used herein, various presence verbs "comprises," "includes" or "comprising," "including" when used in this specification, specify a presence of stated features, integers, steps, operations, elements, or components, but do not preclude the presence or addition of one or more other features, integers, steps, operations, elements, components, or groups thereof.

As used herein, a term "or" is intended to mean an inclusive "or" rather than an exclusive "or." That is, unless specified otherwise, or clear from context, "X employs A or B" is intended to mean any of a set of natural inclusive permutations. That is, if X employs A; X employs B; or X employs both A and B, then "X employs A or B" is satisfied under any of the foregoing instances.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled artisans understand that typically there is no limit on number of items or terms in any combination, unless otherwise apparent from the context.

As used herein, unless otherwise defined, all terms (including technical and scientific terms) used herein have the same meaning as commonly understood by one of ordinary skill in an art to which this disclosure belongs. Various terms, such as those defined in commonly used dictionaries, should be interpreted as having a meaning that is consistent with a meaning in a context of a relevant art and should not be interpreted in an idealized or overly formal sense unless expressly so defined herein.

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

As used herein, a term "about" or "substantially" refers to a +/−10% variation from a nominal value/term. Such variation is always included in any given value/term provided herein, whether or not such variation is specifically referred thereto.

Features described with respect to certain embodiments may be combined in or with various some embodiments in any permutational or combinatory manner. Different aspects or elements of example embodiments, as disclosed herein, may be combined in a similar manner.

Although various terms first, second, third, and so forth can be used herein to describe various elements, components, regions, layers, or sections, these elements, components, regions, layers, or sections should not necessarily be limited by such terms. These terms are used to distinguish one element, component, region, layer or section from another element, component, region, layer or section. Thus, a first element, component, region, layer, or section discussed below could be termed a second element, component, region, layer, or section without departing from various teachings of this disclosure.

Features described with respect to certain example embodiments can be combined and sub-combined in or with various other example embodiments. Also, different aspects or elements of example embodiments, as disclosed herein, can be combined and sub-combined in a similar manner as well. Further, some example embodiments, whether individually or collectively, can be components of a larger system, wherein other procedures can take precedence over or otherwise modify their application. Additionally, a number of steps can be required before, after, or concurrently with example embodiments, as disclosed herein. Note that any or all methods or processes, at least as disclosed herein, can be at least partially performed via at least one entity in any manner.

Example embodiments of this disclosure are described herein with reference to illustrations of idealized embodiments (and intermediate structures) of this disclosure. As such, variations from various illustrated shapes as a result, for example, of manufacturing techniques or tolerances, are to be expected. Thus, various example embodiments of this disclosure should not be construed as necessarily limited to various particular shapes of regions illustrated herein, but are to include deviations in shapes that result, for example, from manufacturing.

Any or all elements, as disclosed herein, can be formed from a same, structurally continuous piece, such as being unitary, or be separately manufactured or connected, such as being an assembly or modules. Any or all elements, as disclosed herein, can be manufactured via any manufacturing processes, whether additive manufacturing, subtractive manufacturing, or other any other types of manufacturing. For example, some manufacturing processes include three dimensional (3D) printing, laser cutting, computer numerical control routing, milling, pressing, stamping, vacuum forming, hydroforming, injection molding, lithography, and so forth.

FIG. 1 shows execution steps of augmented-reality based e-commerce transactions, according to a method 100. FIGS. 18-21 show various embodiments of screenshots of various actions by a fan client to obtain a memorabilia item according to this disclosure. The method 100 shown in the FIG. 1 may include execution steps 102, 104, 106, 108, and 110. However, it should be appreciated that other embodiments may comprise additional or alternative execution steps, or may omit one or more steps altogether. It should also be appreciated that other embodiments may perform certain execution steps in a different order; steps may also be performed simultaneously or near-simultaneously with one another. In addition, the method 100 of the FIG. 1 is described as being executed by a server (e.g., hardware, virtual, application, cloud) in this embodiment. Note that serverless computing platform is possible as well. The server executing one or more steps may be programmed to execute various other, unrelated essential features. The steps may also be executed by a plurality of server computers operating in a distributed computing and network environment.

In step 102, the server may communicate with a first electronic device via a network. The first electronic device may be associated with a first user profile of a first user. The first electronic device may be operated by the first user. The first user may be an athlete, a musician, or any other suitable entertainer. For example, the athlete may be a professional basketball player, football player, hockey player, baseball player, golf player, car driver, bicyclist, billiards player, bowling player, or others. Non-limiting examples of the first electronic device may include a mobile device, a smartphone, a tablet device, a wearable, a head-worn eyewear device, or others. The first electronic device may include a processor, a touchscreen, a speaker, a microphone, a NFC reader, a GPS chip, and a camera.

The first user may operate the first electronic device to capture a first image or images or video of an object from single or various angles (e.g., top, side, bottom, perspective) using the camera of the first electronic device. The object may be a sports collectible, such as a sneaker, a helmet, a hockey stick, a baseball glove, a baseball bat, a golf club, a soccer ball, a cricket bat, a cricket ball, a boxing glove, a football, a basketball, a hockey puck, a golf ball, a bowling bowl, a baseball, etc. The object may be a shoe. The object may be a sneaker, which can be signed. The object may be an article of clothing, such as a t-shirt, a cap, a pair of shorts, a jersey, a glove, a baseball glove, a costume, a tutu, or others. The object may be a musical instrument, such as an electric guitar, a bass guitar, a synthesizer, an acoustic guitar, a double bass, a cello, a drums, a violin, etc.

The first image may include a set of images depicting the object from a set of angles that are different from each other. The set of images of the object may depict a front view of the object, a rear view of the object, a left side view of the object, a right side view of the object, a top view of the object, a bottom view of the object, and an isometric view of the object. The set of images can include a video.

The processor of the first electronic device may execute one or more image processing algorithms to preprocess, binarize, dewarp, correct brightness, or color of the first image of the object. The first electronic device may then transmit the first image of the object to the server. The server may receive the first image of the object from the first electronic device. The server may execute the one or more image processing algorithms to preprocess, binarize, dewarp, correct brightness and color of the first image of the object.

The server may determine information associated with the first user profile of the first user operating the first electronic device. The information associated with the first user profile may include a schedule (e.g., a calendar). The schedule may include an event entry of an event. The event entry may include a date, a time period, a start time, an anticipated or forecasted end time (which may dynamically change if a game goes into overtime based on the server communication with a data source monitoring the game or a performance event), a duration, and a set of location data of the event (e.g., geofence coordinates, Cartesian coordinates). For example, the event entry can include a home team name, a visiting team name, a game start time, an anticipated or forecasted end time, a set of location data for the game, and a player associated with the home team name or the visiting team name. The event may include a music concert, a soccer game, etc. The server may associate the first image of the object with the event entry listed on the schedule associated with the first user profile of the first user.

Additionally or alternatively, the server may cause (e.g., allow, enable, not halt, send, communicate) a first copy (or instance) of an application (e.g., a mobile app) to run on the first electronic device in a first modality of operation activated via the first user profile (e.g., based on a player login). The first copy of the application may be an augmented realty software program or programed programmed to present an augmented reality content. The first copy of the application may operate with the camera of the first electronic device, which may be within a preset time period before an event begins, as preset by an operator of the server based on the schedule (e.g., within 2 hours before a start time of a basketball game as listed in the schedule). For example, the application may not allow the first image to be captured outside of that preset time period before the event begins, as enforced via the schedule based on the first electronic device communicating with the server via the first copy of the application. The first copy of the application may capture the first image (e.g., single or multiple photos or videos) of the object using the camera of the first electronic device. The first copy of the application may be associated with the one or more image processing algorithms, which may preprocess, binarize, dewarp, correct brightness and color of the first image of the object. The first copy of the application may enable the first image of the object to be associated with the event entry of the event associated with the first user profile. The first copy of the application may transmit the first image of the object to the server. The server may receive the first image of the object.

In step 104, the server may process the first image of the object (e.g., via computer vision, object detection, side detection, color detection, texture detection, pose, orientation, edge detection, silhouette detection, outline detection, OCR) to detect or identify the object (e.g., its silhouette, outline, edges, volume, external sides, external color, external texture, shoelaces, content, letters, numbers, symbols, graphics). As such, the server may determine one or more elements within the first image of the object. The one or more elements within the first image of the object may include letters, texts, characters, symbols, pictures, color, size, texture, external sides (e.g., sneaker panels), tags, or others. For example, the server may detect the object within the first image. The server may search a database (e.g., relational, graph, in-memory, NoSQL), which may include a plurality of images of a plurality of objects taken previously vi the first electronic device or other electronic devices, whether or not associated with the first profile. The server may search the database using the one or more elements within the first image of the object as an input. For example, the search may be based on or by color identifiers, skin identifiers, panel identifiers, logo identifiers, or other content detected on the object via the server (e.g., via computer vision, object detection, side detection, color detection, texture detection, pose, orientation, edge detection, OCR). For example, the database may have a schema programmed or optimized for searching by based on or by color identifiers, skin identifiers, panel identifiers, logo identifiers, or other content detected on the object via the server. For example, the search of the database may be similar to a reverse image search (e.g., a reverse Google search).

In step 106, the server may identify a second image (e.g., single or multiple images or videos or CAD models) depicting the object in the database based on the one or more elements detected within the first image of the object as the input. For example, the CAD model can be colored, black and white, grayscale, or others.

In step 108, the server may identify an augmented reality content associated with the second image of the object in the database. For example, the identification can include retrieve preexisting augmented reality content or generate a new augmented reality content based on the first image. The augmented reality content may include information associated with the object, such as a graphic associated with the object, an avatar associated with the object, a type of the object, a size of the object, a price of the object, a color of the object, or others.

In step 110, the server may communicate with a second electronic device via the network. The second electronic device may be associated with a second user profile of a second user. The second electronic device may be operated by the second user. The second user may be a fan of the first user, such as the athlete or the musician. For example, the fan may have no personal connection to the performer (e.g., not teammate thereof, not family thereof, not friend thereof, not service provider thereof). Non-limiting examples of the second electronic device may include a mobile device, a smartphone, a tablet device, a wearable, a head-worn eyewear device, or others. The second electronic device may include a processor, a touchscreen, a speaker, a microphone, a NFC reader, a GPS chip, and a camera.

The server may cause (e.g., allow, enable, not halt, send, communicate) a second copy (or instance) of the application to run on the second electronic device in a second modality of operation activated via the second user profile of the second user, as shown in FIGS. 18-21. The first modality of operation is different from the second modality of operation. For example, this difference may include less or more user functionality or less or more screens or different user interfaces or others. The server may cause (e.g., allow, enable, not halt, send, communicate) the second copy of the application to run on the second electronic device during the time period (e.g., between the start time of the event and the anticipated or forecasted end time or the event or a preset time period immediately after the event as preset by the operator of the server) on the date within a defined area (for example, a rink, a court, a stadium, arena, concert hall) that is associated with the location and that physically encloses the object and the performer immediately after the start time of the event (e.g., the professional basketball game).

The second copy of the application may be the augmented realty software program or an application for programmed to present the augmented reality content, as shown in FIGS. 18-21. The second copy of the application may present the augmented reality content associated with the second image of the object when the second copy is optically (or RF) activated or triggered (e.g., via camera), as shown in FIGS. 18-21. The second copy of the application may be optically (or RF) activated or triggered when the second electronic device (e.g., the camera) is directed at or pointed at one or more specific locations or areas within or outside the stadium (or the venue) during the time period on the date (e.g., a jumbotron, a scoreboard, a news ticker) or a vehicle traveling within or outside the stadium (or the venue), as shown in FIGS. 18-21. For example, a drone or a helicopter or a hot air balloon or an airplane or a content disposed thereon or carried thereby. For example, the trigger can be a physical object or a graphical or alphanumeric content positioned within the venue during or within the preset time period after the game based on the entry of the calendar that is recognized via the fan instance running a computer vision algorithm on the fan client while the fan camera is imaging the venue during or within the preset time period after performance event based on the entry of the calendar and detecting the object or the content within the venue during or within the preset time period after performance event based on the entry of the calendar. For example, the object or the content is a team mascot, a team logo, a team graphic, the professional performer, a sports object, a poster, or a visual information presented on a jumbotron. The one or more specific locations may include a barcode or a marker or a machine code reader, which may be a hardware device, or an object recognizable via computer vision algorithms (e.g., object detection, side detection, color detection, texture detection, pose, orientation, edge detection, silhouette detection, outline detection, OCR) within the second copy. When the second electronic device (e.g., the camera) is directed or pointed at the one or more specific locations within or outside the defined area for at least a predetermined amount of time (or other areas or vehicles within or outside the stadium or venue), the second copy of the application running on the second electronic device may optically read the barcode or the marker or the machine code reader or an object recognizable via computer vision algorithms (e.g., object detection, side detection, color detection, texture detection, pose, orientation, edge detection, silhouette detection, outline detection, OCR), which may then activate or trigger the second copy of the application to present the augmented reality content on the second electronic device. As such, as shown in FIGS. 18-21, when the second copy of the application is activated, the second copy of the application may responsively cause a presentation of the augmented reality content associated with the second image of the object on the second electronic device.

The second copy of the application running on the second electronic device may cause the second user profile of the second user to be associated (e.g., one-to-one, one-to-many, many-to-many, many-to-one) with the augmented reality content, which is associated with the second image of the object, based on the second user acting with the second electronic device while the augmented reality content is displayed on the second electronic device, as shown in FIGS. 18-21. The second user action may be a user touch input (e.g., press, long press, swipe, flick, fingerprint reader) on the second electronic device while the augmented reality content associated with the second image of the object is displayed on the second electronic device. The second user action may be a touchscreen gesture corresponding to the second electronic device while the augmented reality content associated with the second image of the object is displayed on the second electronic device, as shown in FIGS. 18-21. The second user action may be a touchscreen swipe or a touchscreen flick on the second electronic device while the augmented reality content associated with the second image of the object is displayed on the second electronic device, as shown in FIGS. 18-21. The second user action may be shaking of the second electronic device while the augmented reality content associated with the second image of the object is displayed on the second electronic device. The second user action may be speaking into the second electronic device while the augmented reality content associated with the second image of the object is displayed on the second electronic device (e.g., noise cancellation may be employed to reduce or minimize effects of fan noise at a game). The second user action may be rotating or spinning the second electronic device while the augmented reality content associated with the second image of the object is displayed on the second electronic device.

The second copy of the application running on the second electronic device may perform an e-commerce action (e.g., electronically reserve, electronically purchase, physically receive) with respect to the object based on the second user action. For example, the e-commerce action may include e-purchasing the object (e.g., e-shopping cart) via the second copy. The e-commerce action may include submitting an e-bid associated with the object during an online auction of object via the second copy.

First non-limiting example—a soccer player may use a first mobile phone having a camera and running a first copy of an application in a first mode to capture an image of a t-shirt and send the image to a server. The server identifies or generates and then associates an augmented reality content with the image and the image with a soccer game calendar entry associated with the soccer player. The soccer game calendar entry may recite that a soccer game be played in a stadium X having a set of geographic coordinates Y on 1 Jan. 2020 between 4-6 pm ET. A fan may have a second mobile phone having a camera and running a second copy of the application in a second mode different from the first mode. The fan may visit the stadium X having the set of geographic coordinates Y on 1 Jan. 2020 between 4-6 pm ET, the second copy on the second mobile phone may be optically activated or triggered (e.g., via the camera) and display the augmented reality content when the fan may direct the second mobile phone (e.g., the camera) at a location within the stadium (e.g., a barcode on a jumbotron, a team name or a team icon or a team graphic or a team mascot on a field or a detectable object within or outside the field or a recognizable content within or outside the field), as shown in FIGS. 18-21. The location within the stadium may include a barcode or a marker or a machine code reading device or a detectable object within or outside the field or a recognizable content within or outside the field, which may synchronize with the second copy running on the second mobile phone when the second mobile phone is directed at the barcode or the marker or the machine code reading device or a detectable object within or outside the field or a recognizable content within or outside the field, as shown in FIGS. 18-21. Likewise, the second mobile phone may employ computer vision (e.g., object detection, edge detection, OCR), as shown in FIGS. 18-21. The second user may then execute an e-commerce action to purchase the t-shirt or enter into a raffle of the t-shirt.

Second non-limiting example—a first basketball player of a first team may use a first mobile phone having with a camera and running a first copy of an application in a first mode to capture an image of a shoe. A second basketball player of a second team may use a second mobile phone having a camera and a second copy of the application in the first mode to capture an image of a cap. The first basketball player sends the image of the shoe to the server. The second basketball player sends the image of the cap to the server. The server associates a first augmented reality content with the image of the shoe and a game event schedule entry of the first basketball player and the second basketball player. The server associates a second augmented reality content with the image of the cap and the game event schedule entry of the first basketball player and the second basketball player. The basketball game may be played in a stadium on 1 Jan. 2020 between 4-6 pm ET. A user may have a third mobile phone with a camera and running a third copy of the application in a second mode. The user may visit the stadium on $1^{st}$ January between 4-6 pm ET, the third copy of the application on the third mobile phone may be optically activated or triggered (e.g., via the camera) and present the first augmented reality content and the second augmented reality content on the third mobile phone when the user directs or points the third mobile phone (e.g., the camera) at a location within the stadium, as shown in FIGS. 18-21. The location within the stadium may include a barcode or marker or machine code reading device, which may synchronize with the third copy of the application running on the third mobile phone when the third mobile phone (e.g., camera) is directed at the barcode or marker machine code reading device, as shown in FIGS. 18-21. The user may swipe or flick (or shake the third mobile phone or spin the third mobile phone or rotate the third mobile phone or provide another user input action to the third mobile phone) a display screen of the third mobile phone to scroll through or iterate through or carousel through the first augmented reality content and the second augmented reality content, as shown in FIGS. 18-21. The user may select the first augmented reality content or the second augmented reality content for performing an e-commerce action, as shown in FIGS. 18-21. For example, the e-commerce action can include an entry into a contest or raffle. The contest or raffle may include multiple users within the stadium (all running copies of same application in same fan mode) and only one user may be randomly selected, as shown in FIGS. 18-21. The randomly selected user may e-pay the money (e.g., Venmo, Paypal) and purchase the shoe via the first augmented reality contest. The shoe may be delivered by postal mail to an address of the randomly selected user.

Figure 2:
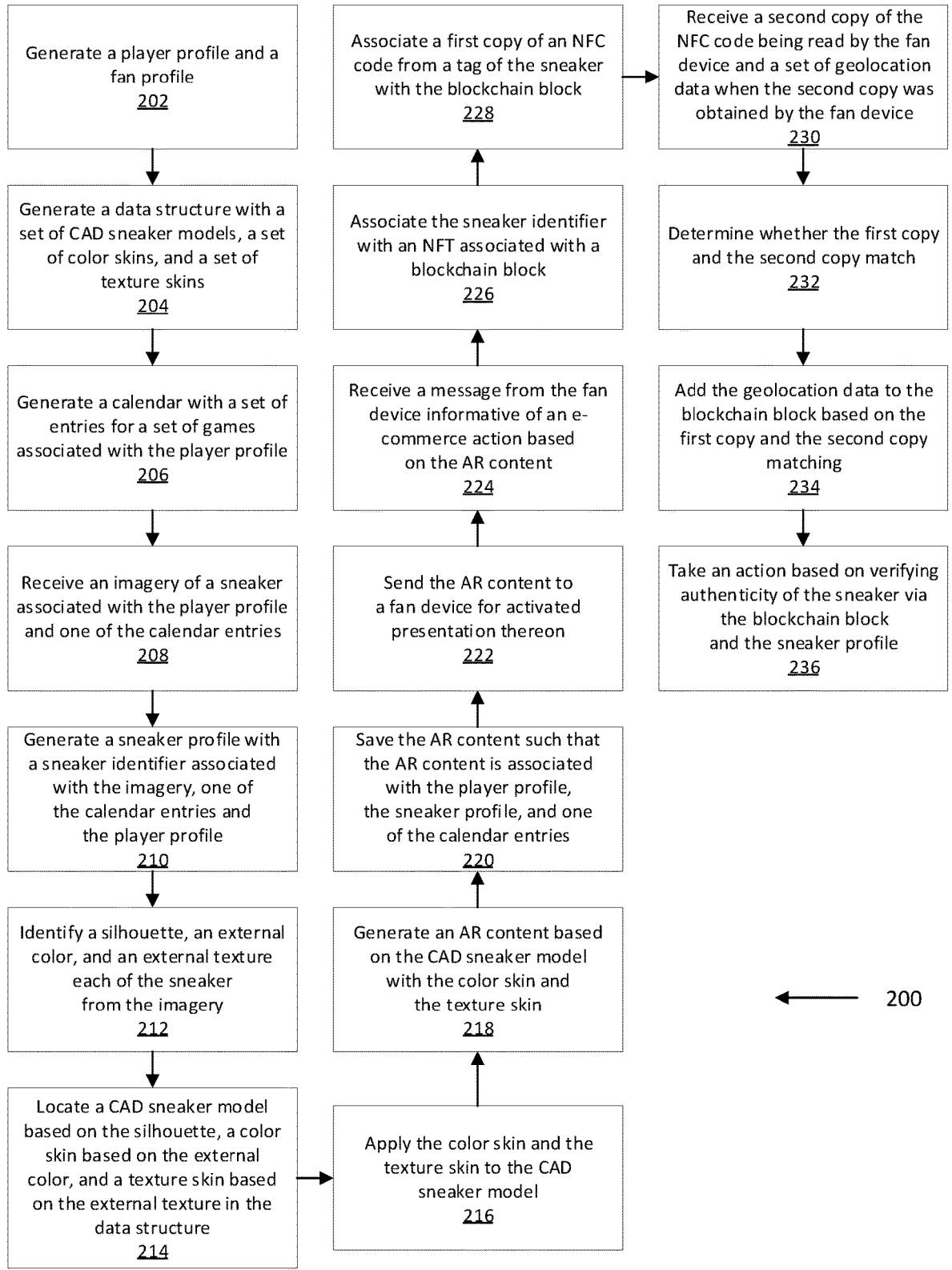
FIG. 2 shows a flowchart of an embodiment of a method for a server to enable an e-commerce transaction based on an augmented reality content according to this disclosure.
Figure 22:
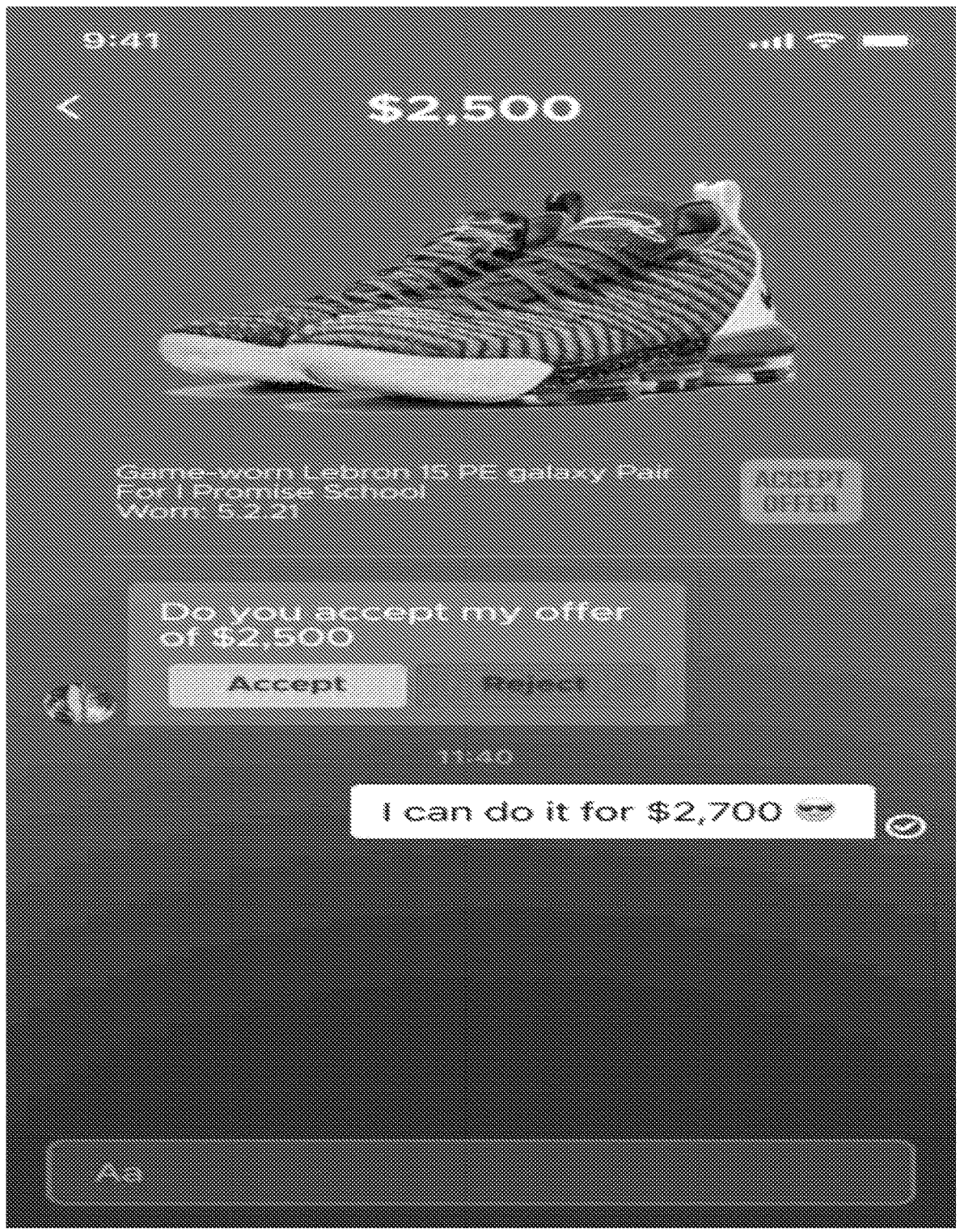
FIGS. 22-23 show various embodiments of screenshots of reselling the memorabilia item according to this disclosure.
Figure 23:
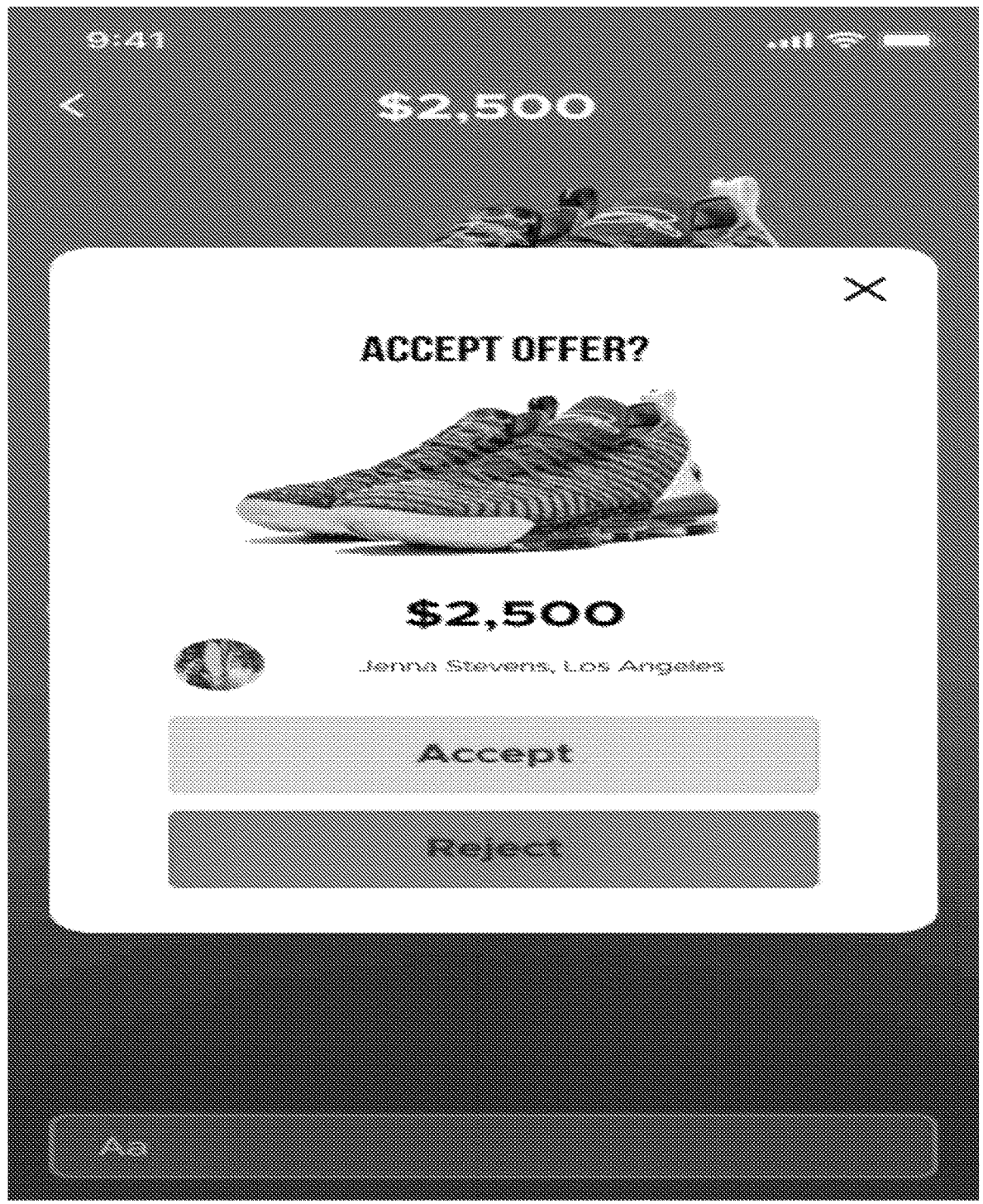

FIG. 2 shows a flowchart of an embodiment of a method for a server to enable an e-commerce transaction based on an augmented reality content according to this disclosure. FIGS. 18-21 show various embodiments of screenshots of various actions by a fan client to obtain a memorabilia item according to this disclosure. FIGS. 22-23 show various embodiments of screenshots of reselling the memorabilia item according to this disclosure. A method 200 includes a set of steps 202-236.

In step, 202, the server generates a player (or performer) profile and a fan profile based on receives a player set of data from a player client (e.g., a phone, a desktop, a laptop, a tablet) and a fan set of data from a fan client (e.g., a phone, a desktop, a laptop, a tablet). Each of the player and the fan set of data include personal information (e.g., name, address contact information, email). In order to minimize fake profiles of the players, there may be further validation actions performed by the server (e.g., validation with a $3^{rd}$ party data source, a server of a professional sports league or a governmental source, an automated call to a private phone number of the player) or there may be more information required to be provided for creation of the player profile. For example, the player profile may be created temporarily but validated as authentic based on an operator of the server calling the player and confirming that the player is who he/she is, otherwise, the player profile may not validated or saved, or deleted within a certain period of time of opening (e.g., within few hours or few days) if no validation activity.

In step 204, the server generates (or receives or enabled to access) a data structure (e.g., a database) storing a set of CAD sneaker (or other memorabilia items) models, a set of color skins for each of the CAD sneaker models, and a set of texture skins for each of the CAD sneaker models and each compatible with each color skin model or specifically corresponded to be compatible with certain color skin models (if not each compatible). For example, a CAD sneaker model may have a one to many correspondence to each of color skin and each texture skin, and each color skin may have many to many correspondence to each texture skin. The data structure may be local or remote from the server.

In step 206, the server generates (or receives from or accesses another data source) a calendar (or schedule) with a set of entries for a set of games (or performance events) associated with the player profile. For example, for each team, each player may be associated with a game and each game may be associated with at least two teams. Each entry can include a game start time, a game anticipated or forecasted game end time (which can dynamically change based on the server communicating with another data source if the game goes into overtime), a game date, a time zone, a venue identifier, a set of venue coordinates, a team associated with the player data, an opposing team of team associated with the player data, or other relevant data.

In step 208, the server receives an imagery (e.g., photos, videos) of a sneaker (or another memorabilia item) taken from a single or multiple angles via the player client within a preset time period (e.g., 2 hours, 24 hours) before the game start time. The preset time period can be enforced via the fan client communicating with the server based on the calendar. Note that the imagery is sent based on the player logging into a player instance of a mobile app operating in a player modality based on the player profile. Likewise, the mobile app has a fan instance operating in a fan modality different from the player modality (e.g., different user functionality or user interfaces) based on the fan logging into the fan instance of the mobile app based on the fan profile. This configuration is technologically beneficial due to simplicity and cost of management.

In step 210, the server receives the imagery, generates a sneaker profile with a sneaker identifier (e.g., a unique identifier or a multi digit computer generated code), associates the sneaker profile with the imagery and one of the entries of the calendar corresponding to the game associated with the player. As such, the sneaker profile is associated with the player profile and the entry in the calendar associated with the game. Note that the server can receive the imagery of the within a preset time period before the game begins as preset not by the player profile. The preset time period can be enforced via the calendar entry through the player instance operating in the player modality.

In step 212, the server processes the imagery and identifies a silhouette (e.g., outline, profile) of the sneaker, an external side color of the sneaker, and an external side texture of the sneaker. This identification occurs via various computer vision algorithms, such as object detection, side detection, color detection, texture detection, pose, orientation, edge detection, silhouette detection, outline detection, or others.

In step 214, the server queries the data structure to locate (e.g., via searching) a CAD sneaker model in the data structure based on the silhouette identified in the imagery, a color skin in the data structure based on the external side color identified in the imagery, a texture skin in the data structure based on the external side texture identified in the imagery.

In step 216, upon the server locating the CAD sneaker model, the color skin model, and the texture skin model each in the data structure, the server applies the color skin and the texture skin to the CAD sneaker model. If the server is unable to locate the CAD sneaker model, the color skin model, and the texture skin model each in the data structure, then the server generates a new CAD sneaker (or other memorabilia item) model, a new color skin, and a new skin based on the imagery. Then, the server applies the new color skin and the new texture skin to the new CAD sneaker model such that the augmented reality content representative of the sneaker is generated. Additionally or alternatively, the server may also locate a signature (e.g., a copy of an authentic signature associated with the player profile) compatible with each or some of the color skins or the texture skins. The signature can be applies to the color skin, as located, or the texture skin, as located, over the CAD sneaker model to provide an autographed appearance.

In step 218, the server generates an augmented reality content based on the CAD sneaker model skinned with the color skin and the texture skin, as applied.

In step 220, the server saves the augmented reality content in the data structure or another data structure or remote data source such that the augmented reality content is associated with the player profile, the sneaker profile, and the entry in the calendar associated with the game.

In step 222, the server sends (e.g., pushes, pulls) the augmented reality content to the fan client before (e.g., before the game start time), during (e.g., between the game start time and before the end time or anticipated or forecasted end time of the game), or after the game (e.g., within a preset time period after the end time or anticipated or forecasted end time of the game), as determined based on the entry in the calendar associated with the game. Note that the fan client is running the fan instance of the mobile app operating in the fan modality different from the player modality. The augmented reality content is shown in FIGS. 18-21 and can be rotatable or spinning based on the fan input into the fan instance operating in the fan modality.

In step 224, the server receives a message from the fan client running the fan instance of the mobile app operating in the fan modality. The message informs the server that the fan instance received a user input from the fan client, as disclosed herein.

In step 226, responsive to or based on the message, the server associates (or creates) the sneaker identifier in the sneaker profile with an non-fungible token (NFT) associated with a blockchain block (e.g., public, private, hybrid).

In step 228, the server associates a first copy of an interrogation code of an near field communication (NFC) chip secured to the sneaker after the game (e.g., via a tag) with the NFT or the blockchain block, as shown in FIGS. 6-14 and 17. At this time, the sneaker has been purchased or won, as disclosed herein, and the NFC chip is secured or tagged to the sneaker to ensure authenticity before handing the sneaker to the fan or shipping the sneaker to the fan.

Figure 5:
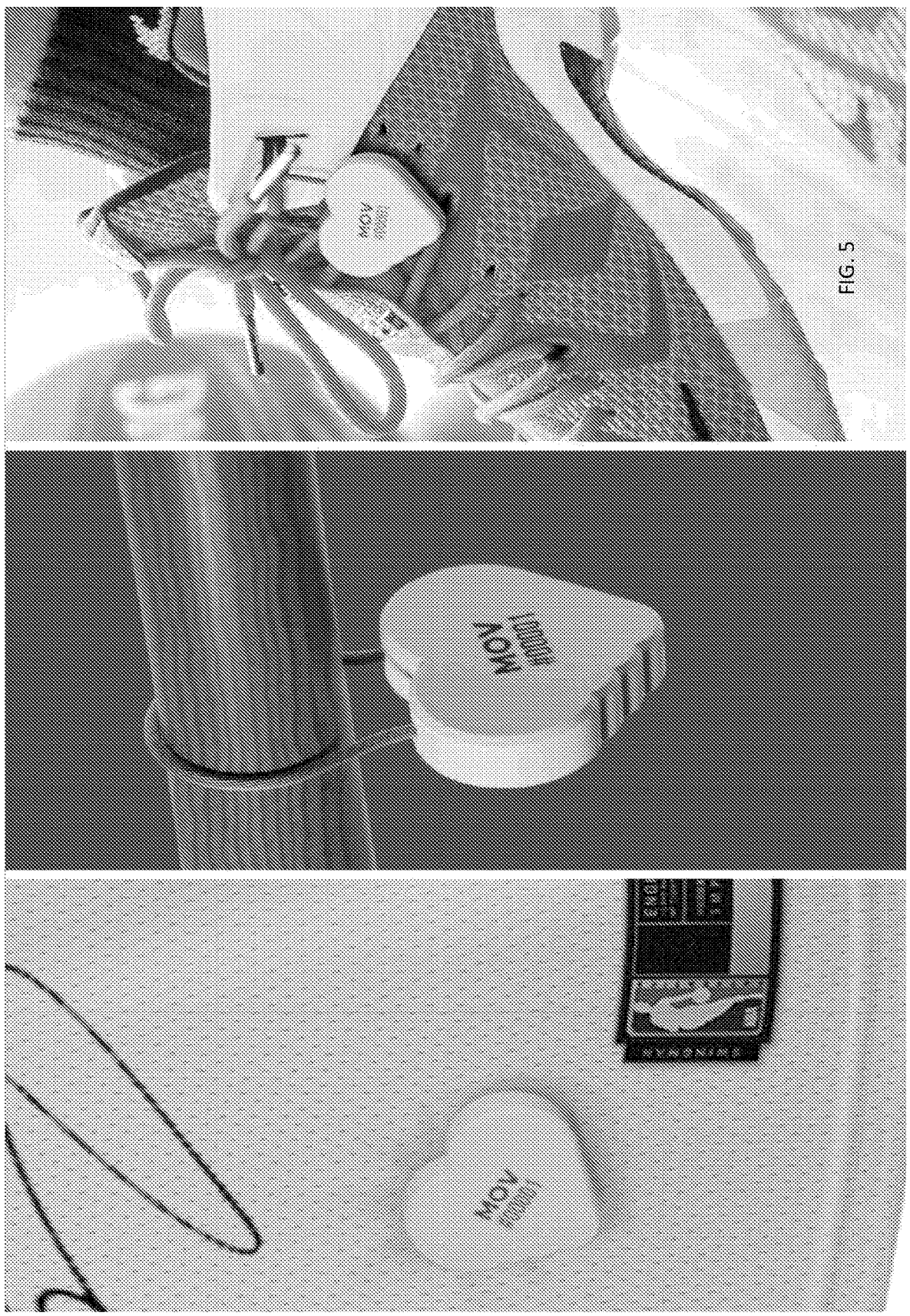
FIGS. 5, 15, and 16 show various views of an embodiment of a tag secured to a memorabilia item (e.g., a basketball jersey, a baseball bat, a basketball sneaker) according to this disclosure.
Figure 6:
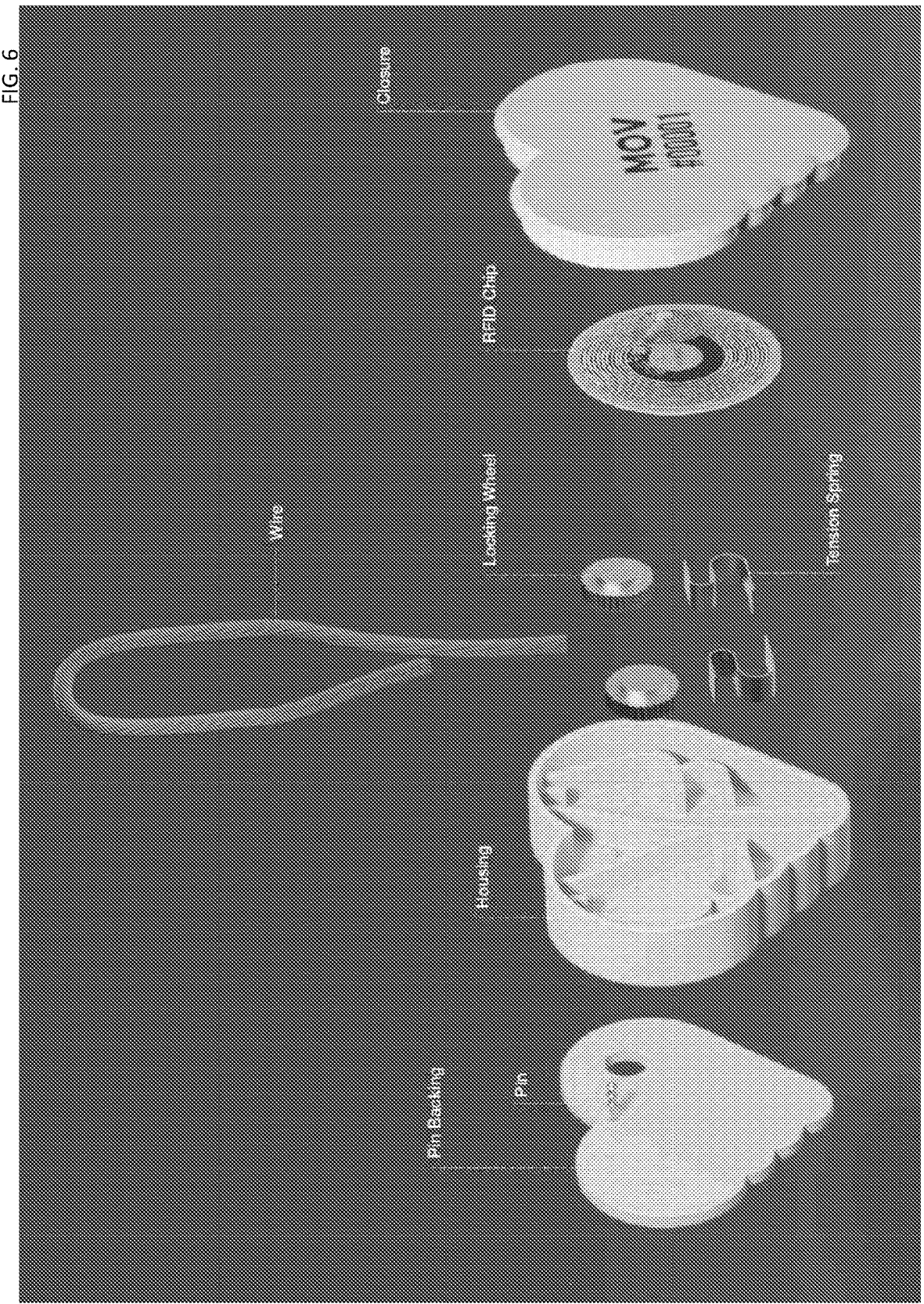
Figure 7:
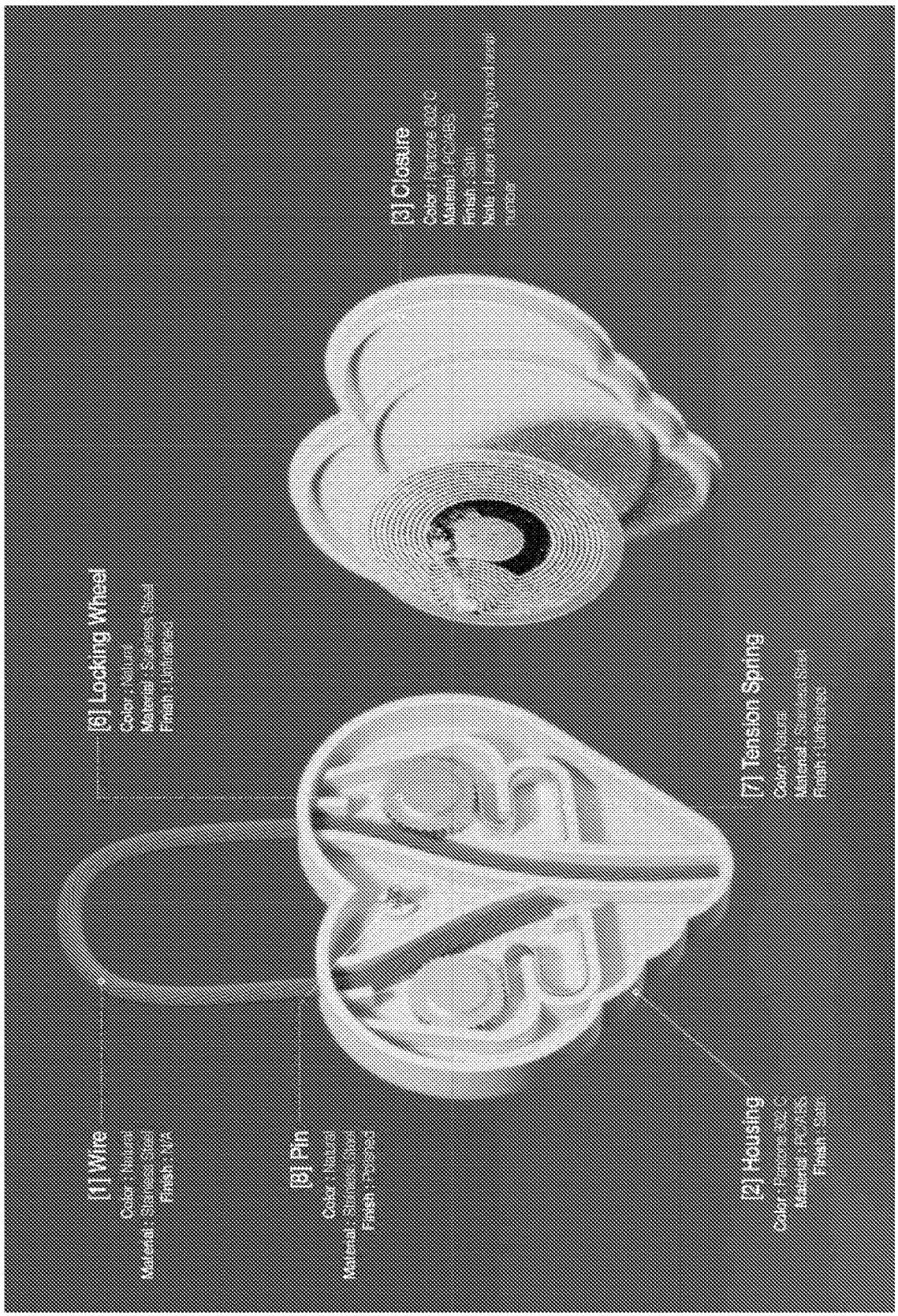
Figure 8:
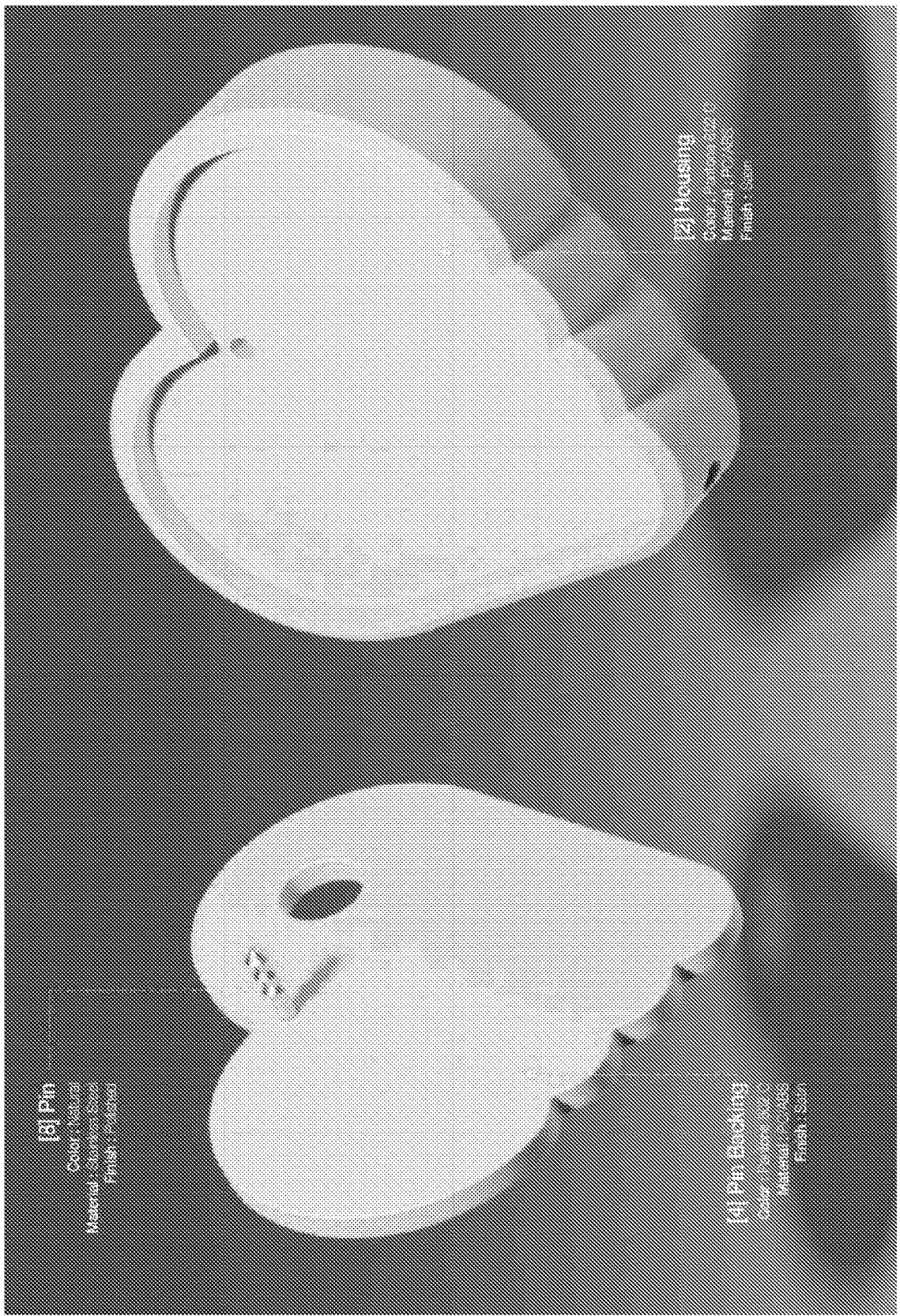
Figure 9:
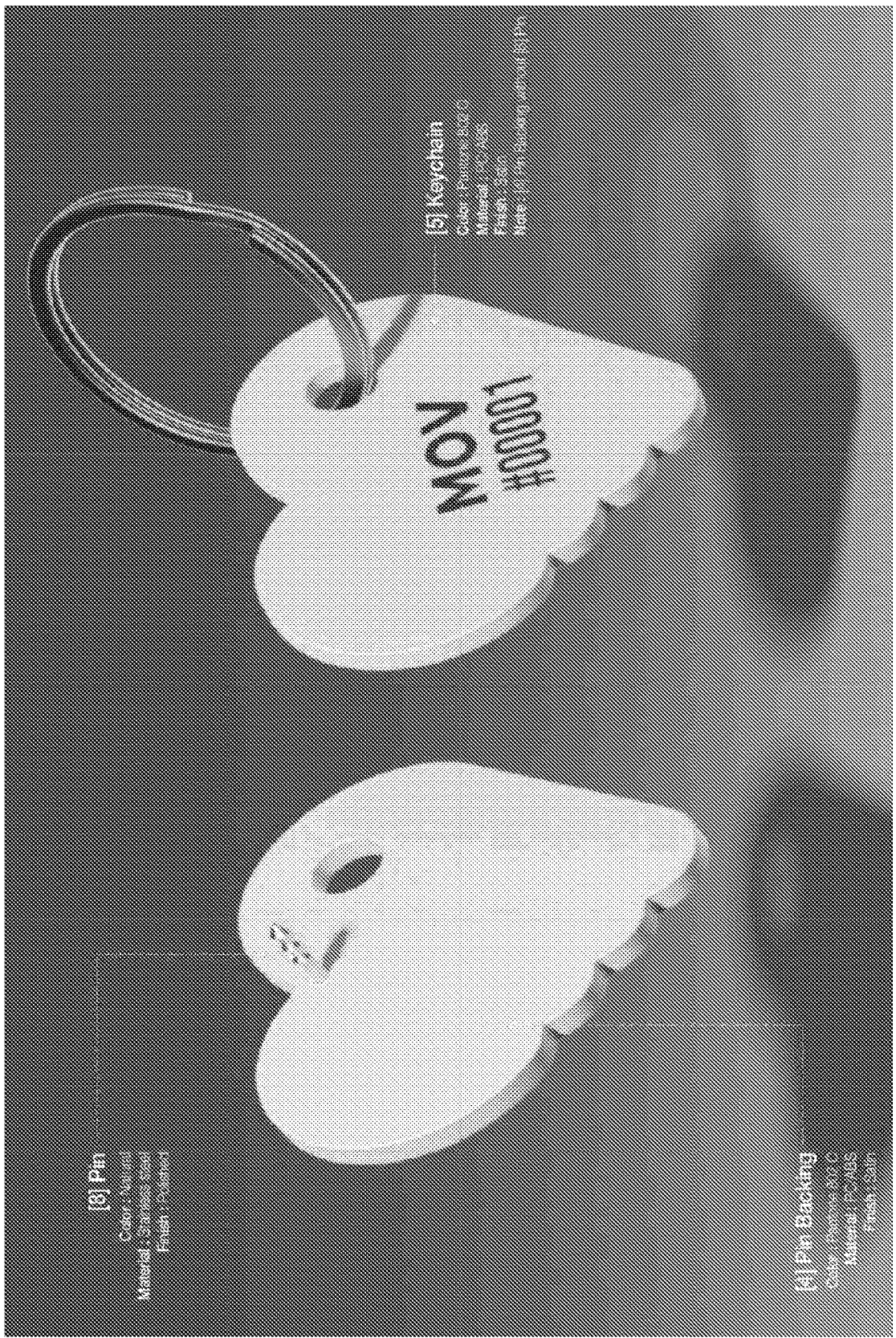
Figure 11:
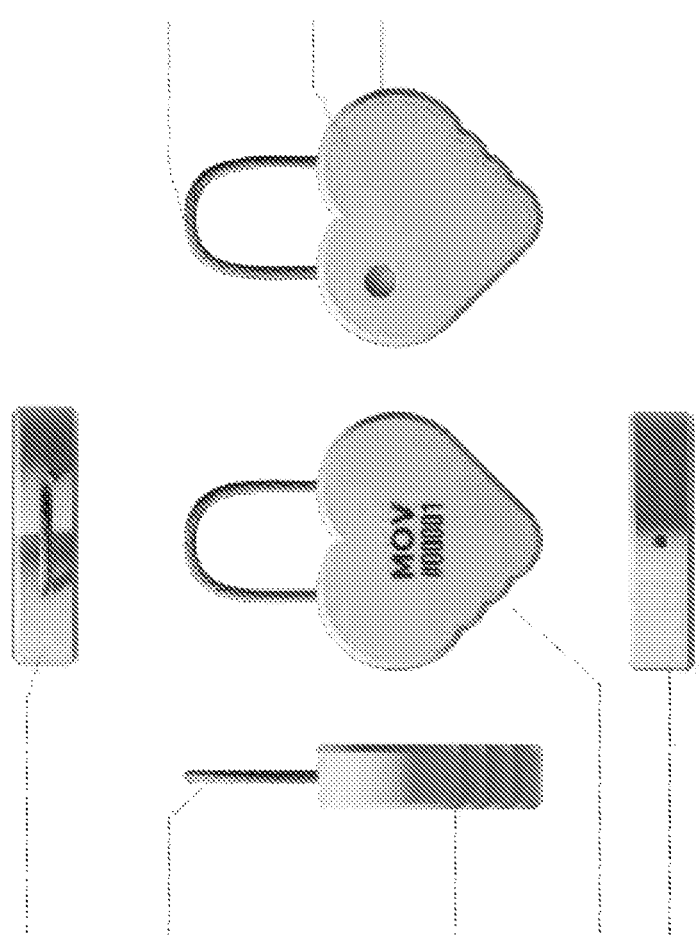
Figure 12:
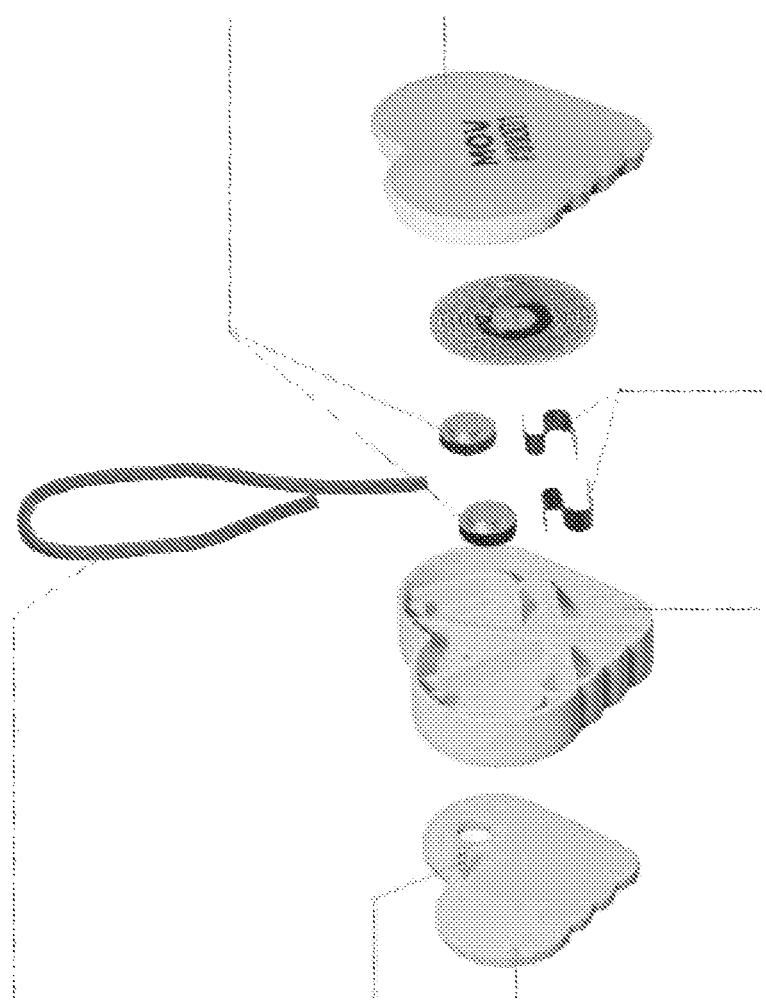
Figure 13:
Figure 14:

In step 230, once the fan receives the sneaker with the NFC chip tagged to the sneaker, as shown in FIG. 5, the fan client running the fan instance of the mobile app operating in the fan modality interrogates the NFC chip on the sneaker to obtain a second copy of the NFC code. At that time, to maximize traceability and authenticity, the fan client running the fan instance of the mobile app operating in the fan modality also obtains a geolocation thereof (e.g., via a signal triangulation, a GPS chip). Then, the fan client running the fan instance of the mobile app operating in the fan modality sends the second copy and a set of geolocation data for the geolocation to the server.

In step 232, the server determines whether the first copy of the interrogation code of the NFC chip, as obtained before sending or handling the sneaker to the fan, matches the second copy of the interrogation code, as obtained via the fan client running the fan instance of the mobile app operating in the fan modality and interrogating the NFC chip secured to the sneaker while the sneaker is physically possessed by the fan.

In step 234, the server writes or adds the geolocation data to the blockchain block based on the first copy matching the second copy or vice versa. For example, the blockchain block may not have any geolocation data at that time.

In step 236, since the sneaker has been authenticated and validated, the server can take an action that allows other electronic transactions with respect to the sneaker, as shown in FIGS. 22-23. For example, the sneaker can be electronically sold or gifted via the server, as shown in FIGS. 22-23, and a next buyer (e.g., via the fan client running the fan instance of the mobile app operating in the fan modality) can use the NFT token or the blockchain block, as including the geolocation data, to ensure authenticity and validity. As such, then next buy can write or add his/her geolocation data, as disclosed herein, to the NFT token or the blockchain block so that there is a chain of custody for the sneaker. For example, the chain of custody can include fan geolocation data, fan profile data, time/date of NFC interrogation, or other suitable data, each of which can at least partially be written or added to the NFT token or the blockchain block.

Figure 3:
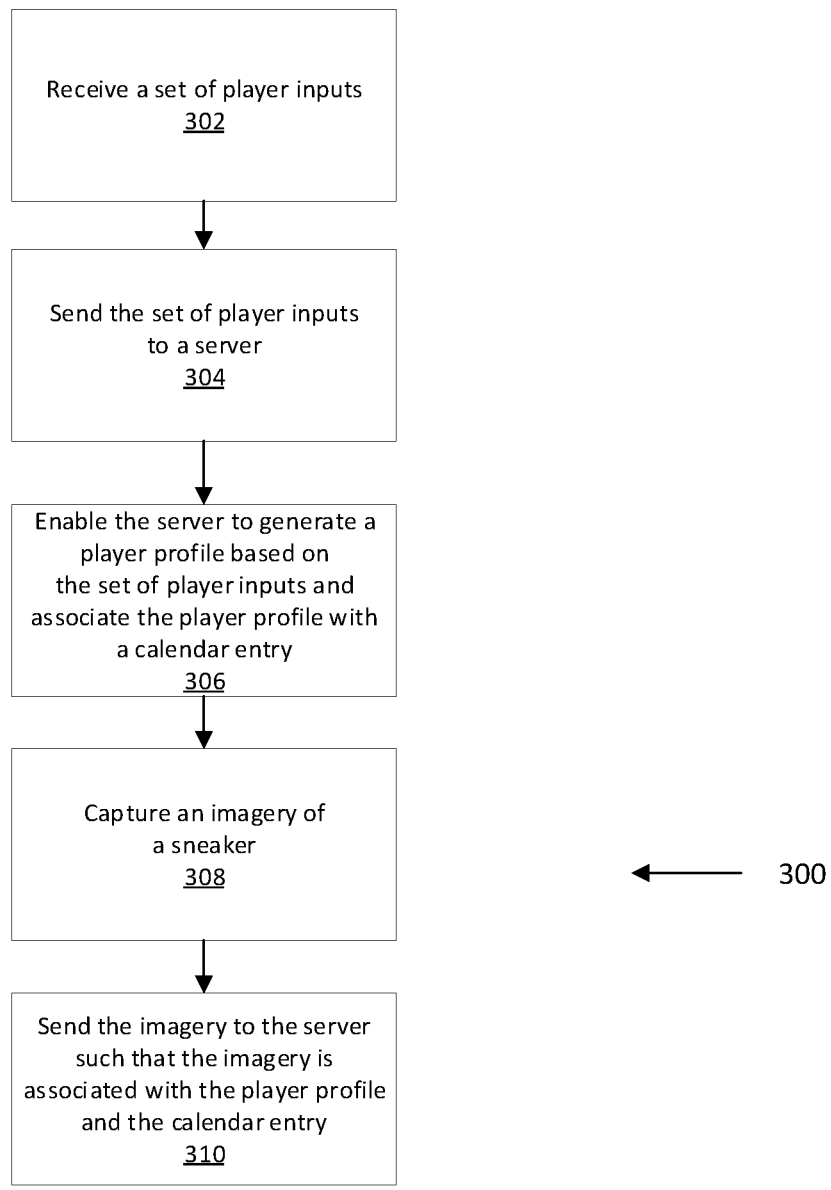
FIG. 3 shows a flowchart of an embodiment of a method for a performer client to enable an augmented reality content to be created according to this disclosure.

FIG. 3 shows a flowchart of an embodiment of a method for a performer client to enable an augmented reality content to be created according to this disclosure. A method 300 includes a set of steps 302-310.

In step 302, the player (or another performer) client (e.g., running the player instance operating in the player modality) receives a set of player inputs, as explained above. For example, the player inputs include personal information (e.g., name, address contact information, email). In order to minimize fake profiles of the players, there may be further validation actions requested by the player client, as disclosed herein.

In step 304, the player client (e.g., running the player instance operating in the player modality) sends the set of player inputs to the server, as disclosed herein.

In step 306, the player client (e.g., running the player instance operating in the player modality) enables the server to generate the player profile based on the set of player inputs and associates the player profile with the calendar entry, as disclosed herein In step 308, the player client (e.g., running the player instance operating in the player modality) captures the imagery of the sneaker (or another memorabilia item), as disclosed herein.

In step 310, the player client (e.g., running the player instance operating in the player modality) sends the imagery to the server.

Figure 4:
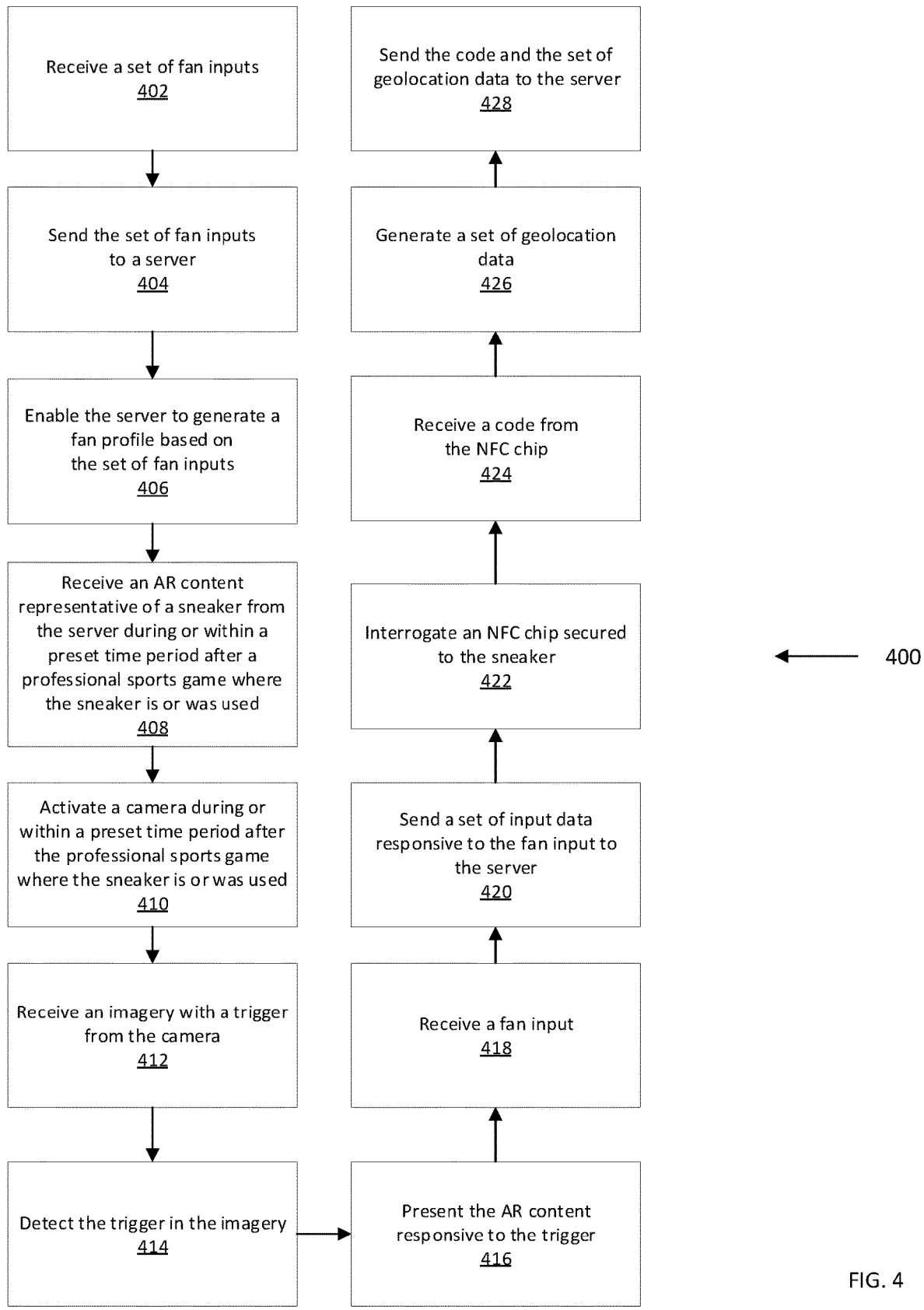
FIG. 4 shows a flowchart of an embodiment of a method for a fan client act based on an augmented reality content according to this disclosure.

FIG. 4 shows a flowchart of an embodiment of a method for a fan client act based on an augmented reality content according to this disclosure. FIGS. 18-21 show various embodiments of screenshots of various actions by a fan client to obtain a memorabilia item according to this disclosure. A method 400 includes a set of steps 402-428.

In step 402, the fan client (e.g., running the fan instance operating in the fan modality) receives the set of fan inputs, as disclosed herein.

In step 404, the fan client (e.g., running the fan instance operating in the fan modality) sends the set of fan inputs to the server, as disclosed herein.

In step 406, the fan client (e.g., running the fan instance operating in the fan modality) enables the server to generate the fan profile, as disclosed herein.

In step 408, as shown in FIGS. 18-21, the fan client (e.g., running the fan instance operating in the fan modality) receives the augmented reality content representative of the sneaker (or another memorabilia item) from the server during or within a preset time period after the game (or another event) where the sneaker is or was used, as disclosed herein.

In step 410, the fan client (e.g., running the fan instance operating in the fan modality) activates the camera during or within the preset time period after the game where the sneaker was used, as disclosed herein.

In step 412, as shown in FIGS. 18-21, the fan client (e.g., running the fan instance operating in the fan modality) generates (or retrieves or accesses) an imagery with a trigger via a camera thereof, as disclosed herein/

In step 414, as shown in FIGS. 18-21, the fan client (e.g., running the fan instance operating in the fan modality) identifies or detects the trigger in the imagery, as disclosed herein.

In step 416, as shown in FIGS. 18-21, the fan client (e.g., running the fan instance operating in the fan modality) presents the augmented reality content responsive to the trigger, as disclosed herein.

In step 418, as shown in FIGS. 18-21, the fan client (e.g., running the fan instance operating in the fan modality) receives a fan input (e.g., gesture, shake, swipe, rotate, spin), as disclosed herein.

In step 420, the fan client (e.g., running the fan instance operating in the fan modality) sends a set of data for the fan input to the server, as disclosed herein.

In step 422, the fan client (e.g., running the fan instance operating in the fan modality) interrogates the NFC chip secured to the sneaker while in near field proximity thereof, as disclosed herein.

In step 424, the fan client (e.g., running the fan instance operating in the fan modality) receives a copy of a code from the NFC chip, as disclosed herein.

In step 426, the fan client (e.g., running the fan instance operating in the fan modality) generates a set of location data for itself while interrogating or receiving the copy of the code from the NFC chip.

In step 428, the fan client (e.g., running the fan instance operating in the fan modality) sends the copy of the code from the NFC chip and the set of geolocation data to the server, as disclosed herein.

Figure 15:
Figure 16:

FIGS. 5, 15, and 16 show various views of an embodiment of a tag secured to a memorabilia item (e.g., a basketball jersey, a baseball bat, a basketball sneaker) according to this disclosure. Note that this tag can be looped onto the memorabilia item with a line (e.g., a cord, a cable, a wire) or secured via a backing interposing or sandwiching the memorabilia item between the tag and the backing. Likewise, note that the tag can be tamper resistant.

Figure 17:
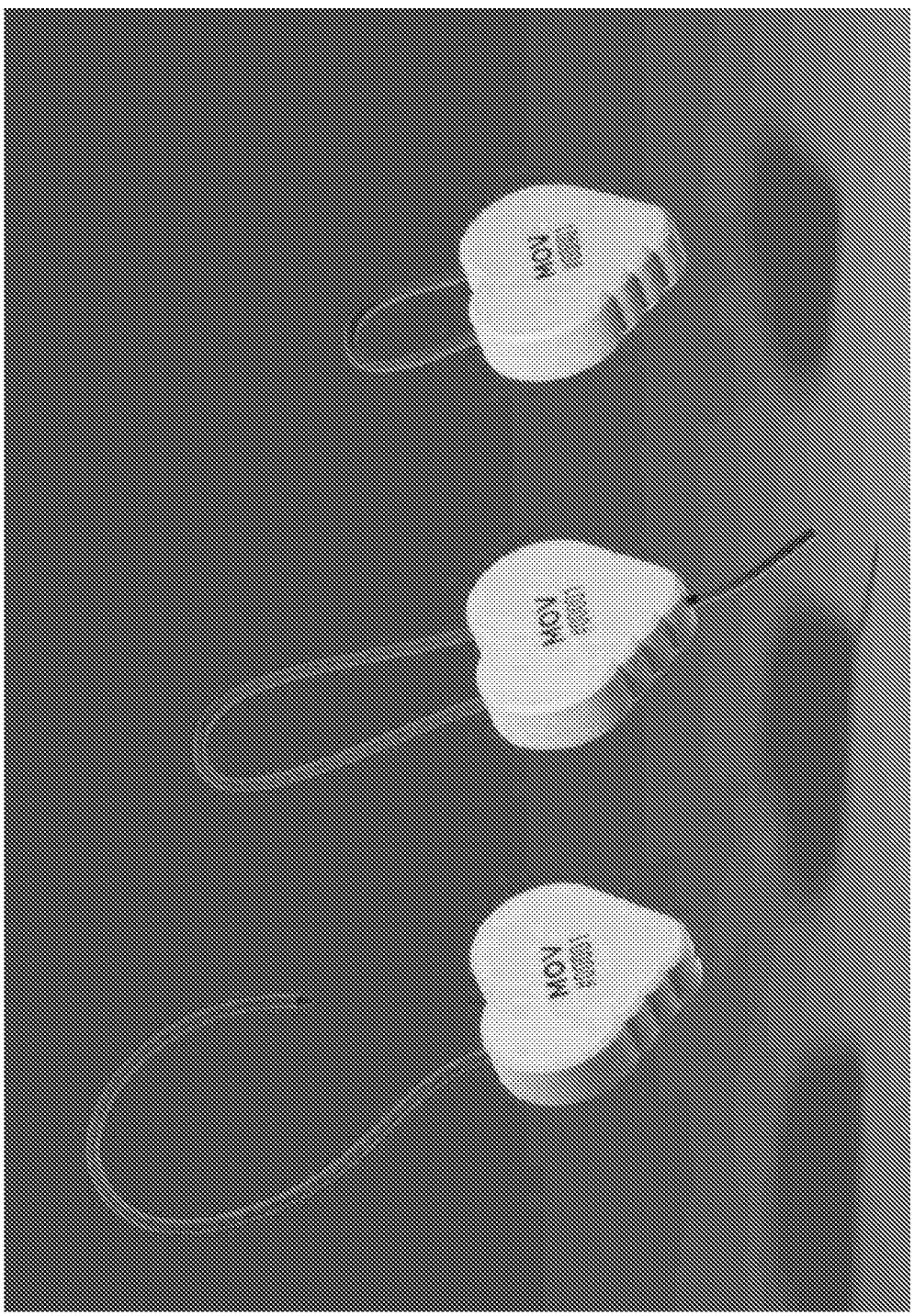
Figure 18:
FIGS. 18-21 show various embodiments of screenshots of various actions by a fan client to obtain a memorabilia item according to this disclosure.
Figure 19:
Figure 20:
Figure 21:
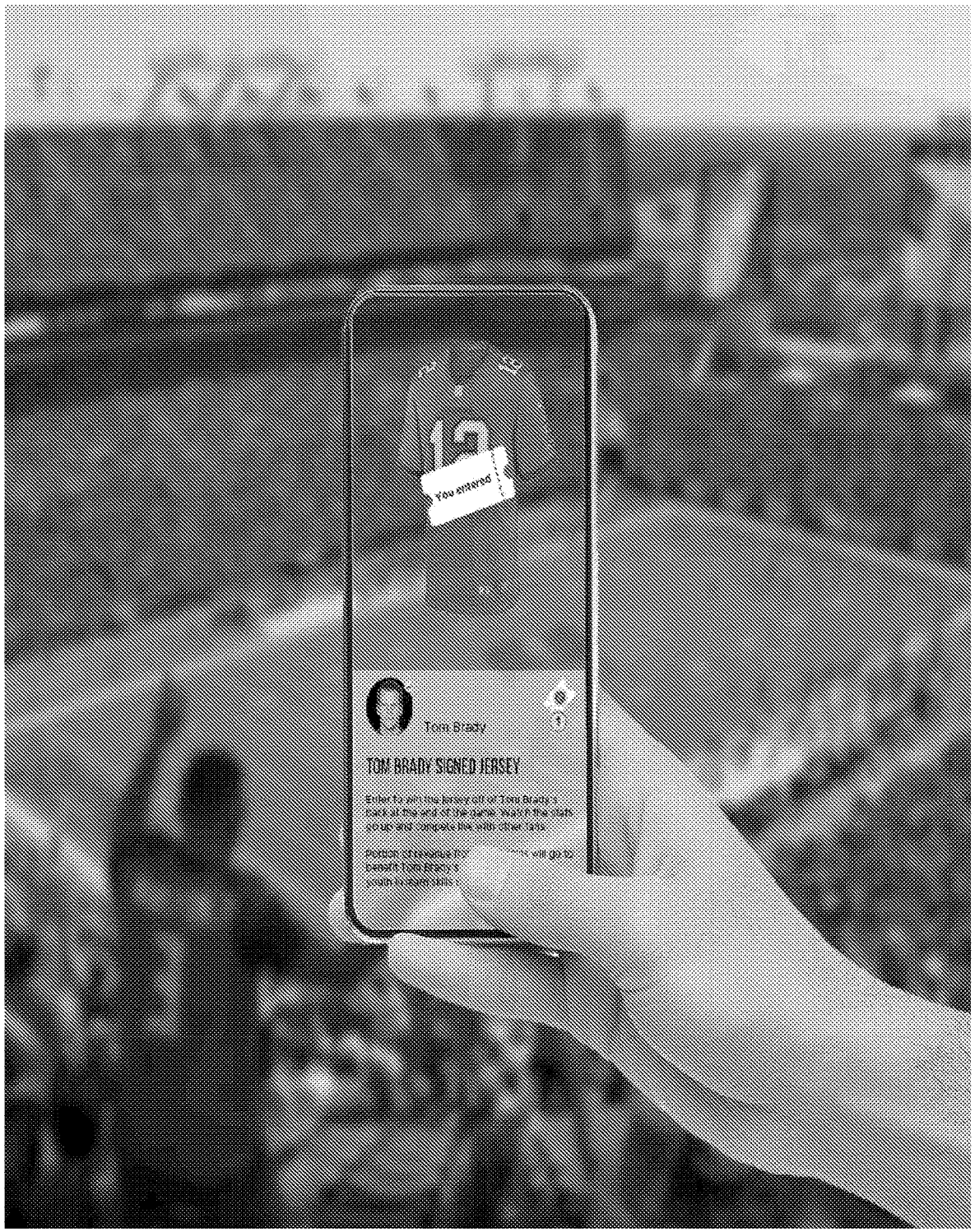

FIGS. 6-14, 17 show various views of an embodiment of a tag configured to be secured to a memorabilia item according to this disclosure. Note that the tag includes a backing side with a rectilinear pin, a housing, and closure side, where the housing is interposed or sandwiched between the backing side and the closure side, and while the pin extends into the housing. Further, the tag includes a wire (or another form of line), a pair of S-shaped tensions springs (although other shapes or other elastic or resilient or shape memory members can be used), a pair of locking wheels, and an RFID chip (can be interrogated via an NFC compatible phone or tablet or laptop or desktop). The wire, which can be braided, can include a metal or a metal alloy (e.g., stainless steel), and both end portions thereof are guided to extend into the housing, while the wire itself engages the pair of locking wheels opposing each other with the wire extending therebetween. The pin extends into the housing between the pair of locking wheels and between at least two sections of the wire. One of the end portions of the wire contacts an end portion of the housing distal from the where the end portion entered the housing. The pair of S-shaped tensions springs engage the pair of locking wheels, which can be in a ratcheting manner. The wire itself extends between the pair of S-shaped tension springs. The closure side has a wall forming a cavity hosting the RFID chip while the wall extends around the RFID chip. The RFID chip can be secured to the closure side (e.g., adhering, bonding, fastening). The RFID chip is interposed between the housing and the closure side. The RFID chip faces or extends over or overlaps some or the pair of locking wheels or some or the pair of S-shaped tension springs or at least a portion of the wire, which can include at least one of the end portions of the wire. The housing has an opening which receives the pin from the backing side. The tag (e.g., the housing or the closure side) can include a hole through which a keychain ring can loop or extend. The tag (e.g., the housing, the backing side, the closure side) can host a logo of the team or the player (or performer) or the game or the operator of the server or sneaker identifier (e.g., unique identifier). The tags are heart-shaped (or another suitable shape), each with at least one corner in order to enable positioning thereof side-by-side via the corners during transportation of a set of tags, which is efficient for shipping and avoids stacking. As shown in FIG. 17, the tag can be secured via one end portion of the wire being secured to the tag (e.g., via one of the locking wheels) and another end portion of the wire is inserted or looped over the sneaker, as shown in FIG. 16, and then that end portion is inserted into the housing of the tag to be guided to one of the locking wheels, until level of extension desired, where that locking wheel effectively prevents the wire or that end portion thereof to be removed out from the housing to cause the tag to become unsecure from the sneaker (or other memorabilia item).

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

The invention claimed is:

1. A method comprising:
   receiving, by a server, a set of performer data from a performer client operated by a performer and a set of fan data from a fan client operated by a fan of the player, wherein the performer client has a performer camera and the fan client has a fan camera;
   generating, by the server, a performer profile based on the set of performer data and a fan profile based on the set of fan data;
   accessing, by the server, a data structure containing a set of CAD memorabilia item models, a set of color skins for each CAD memorabilia item model of the CAD memorabilia item models, and a set of texture skins for each CAD memorabilia item model of the set of CAD memorabilia item models;
   accessing, by the server, a calendar having an entry involving the performer profile for a performance event in a venue on a date at a time when the performance event begins;
   receiving, by the server, an first imagery of a memorabilia item to be worn or used by the performer performing in the performance event in the venue on or before the date and the time when the performance event begins from the performer camera operated in a performer modality of a performer instance of a mobile app running on the performer client and associated with the performer profile, wherein the memorabilia item has an silhouette and an external side with a color and a texture;

identifying, by the server, the silhouette of the memorabilia item in the first imagery, the color of the external side in the first imagery, and the texture of the external side in the first imagery;

performing, by the server, a first selection of a CAD memorabilia item model from the set of CAD memorabilia item models matching the silhouette of the memorabilia item identified in the first imagery, a second selection of a color skin from the set of color skins matching the color of the external side identified in the first imagery, and a third selection of a texture skin from the set of texture skins matching the texture of the external side identified in the first imagery;

applying, by the server, the color skin from the second selection and the texture skin from the third selection to the CAD memorabilia item model from the first selection such that an augmented reality content representative of the memorabilia item is generated;

saving, by the server, the augmented reality content such that the augmented reality content is related to the entry in the calendar;

sending, by the server, the augmented reality content during or within a preset time period after the performance event based on the entry of the calendar to a fan instance of the mobile app running on the fan client during or within the preset time period after performance event based on the entry of the calendar, associated with the fan profile during or within the preset time period after performance event based on the entry of the calendar, operated in a fan modality different from the performer modality during or within the preset time period after performance event based on the entry of the calendar, and programmed to receive a fan input while operating in the fan modality during or within the preset time period after performance event based on the entry of the calendar such that (a) the fan instance in the fan modality presents the augmented reality content during or within the preset time period after performance event based on the entry of the calendar responsive to (i) the fan camera generating a second imagery with a trigger from imaging the venue during or within the preset time period after performance event based on the entry of the calendar while the fan instance operates in the fan modality during or within the preset time period after performance event based on the entry of the calendar and (ii) the fan instance operating in the fan modality during or within the preset time period after performance event based on the entry of the calendar identifying the trigger in the second imagery during or within the preset time period after performance event based on the entry of the calendar based on the entry of the calendar, (b) the fan instance in operating in the fan modality during or within the preset time period after performance event based on the entry of the calendar receiving the fan input responsive to the augmented reality content being presented in the fan instance operating in the fan modality during or within the preset time period after performance event based on the entry of the calendar, and (c) perform an e-commerce action in the fan instance operating in the fan modality during or within the preset time period after performance event based on the entry of the calendar with respect to a sneaker based on the fan input in the fan instance operating in the fan modality.

2. The method of claim 1, wherein the fan input is a touch input into the fan client.

3. The method of claim 1, wherein the fan input is a shake of the fan client.

4. The method of claim 1, wherein the augmented reality content is a first augmented reality content, and further comprising:
sending, by the server, a second augmented reality content different from the first augmented reality content to the fan instance operating in the fan modality during or within the preset time period after performance event based on the entry of the calendar such that the fan instance operating in the fan modality during or within the preset time period after performance event based on the entry of the calendar presents the first augmented reality content and the second augmented reality content and the fan can thereby carousel through the first augmented reality content and the second augmented reality content operating in the fan modality during or within the preset time period after performance event based on the entry of the calendar and provide the fan input.

5. The method of claim 1, wherein the memorabilia item is a sneaker.

6. The method of claim 1, wherein the trigger is a barcode operating within the venue during or within the preset time period after performance event based on the entry of the calendar.

7. The method of claim 1, wherein the trigger is an object or a content positioned within the venue during or within the preset time period after performance event based on the entry of the calendar that is recognized via the fan instance running a computer vision algorithm on the fan client while the fan camera is imaging the venue during or within the preset time period after performance event based on the entry of the calendar and detecting the object or the content within the venue during or within the preset time period after performance event based on the entry of the calendar.

8. The method of claim 7, wherein the object or the content is a team mascot, a team logo, a team graphic, the professional performer, a sports object, a poster, or a visual information presented on a jumbotron.

9. The method of claim 1, wherein the first imagery of the memorabilia item is received within a preset time period before the performance event begins as preset not by the performer.

10. The method of claim 1, wherein the data structure contains a set of personal signatures of the performer compatible with the set of color skins and the set of texture skins, and further comprising:
performing, by the server, a fourth selection of a personal signature of the performer from the set of personal signatures of the performer; and
applying, by the server, the personal signature of the player from the fourth selection to the color skin from the second selection or the texture skin from the third selection such that the augmented reality content representative of the memorabilia item autographed by the performer is generated.

11. The method of claim 1, wherein the trigger is at the venue.

12. The method of claim 1, wherein the trigger is shown on a display not at the venue.

13. The method of claim 1, wherein the e-commerce action include electronically entering a contest with other fan profiles associated with other fan instances of the mobile app based on the fan modality of the other fan instances for the memorabilia item via the fan instance based on the fan modality.

14. The method of claim 1, wherein the e-commerce action include electronically purchasing the memorabilia item via the fan instance based on the fan modality.

15. The method of claim 1, further comprising:
generating, by the server, a new CAD memorabilia item model, a new color skin, and a new texture skin based on the first imagery responsive to the CAD memorabilia item model from the set of CAD memorabilia item models not matching the silhouette of the memorabilia item identified in the first imagery, the color skin from the set of color skins not matching the color of the external side identified in the first imagery, and the texture skin from the set of texture skins not matching the texture of the external side identified in the first imagery;
applying, by the server, the new color skin and the new texture skin to the new CAD memorabilia item model such that the augmented reality content representative of the memorabilia item is generated.

16. The method of claim 1, wherein the memorabilia item has a sneaker profile storing a memorabilia item identifier, wherein the fan client has a geolocation chip, and further comprising:
reading, by the server, the memorabilia item profile;
associating, by the server, the memorabilia item identifier from the memorabilia item profile with a non-fungible token associated with a block of a blockchain while the memorabilia item is not in a physical possession of the fan operating the fan client;
associating, by the server, a first copy of a code of an near field communication chip secured to the memorabilia item with the block while the memorabilia item is not in the physical possession of the fan operating the fan client;
receiving, by the server, a second copy of the code and a set of geolocation data generated via the geolocation chip of the fan client when the fan client interrogated the near field communication chip secured to the memorabilia item to read the code while the memorabilia item is in the physical possession of the fan operating the fan client;
receiving, by the server, the second copy from the fan instance of the mobile app operating in the fan modality based on the fan client interrogating the near field communication chip secured to the memorabilia item while the memorabilia item is in the physical possession of the fan operating the fan client;
editing, by the server, the block to include the set of location data responsive to the first code matching the second code while the memorabilia item is in the physical possession of the fan operating the fan client.

17. The method of claim 1, wherein the fan client is an optical head-mounted display.

* * * * *